US012783064B1

(12) United States Patent
Alameh et al.

(10) Patent No.: US 12,783,064 B1
(45) Date of Patent: Nov. 3, 2026

(54) SYSTEM AND METHOD FOR ROUTING AUDIO BETWEEN AN INFORMATION HANDLING SYSTEM AND A MOUSE

(71) Applicant: Dell Products LP, Round Rock, TX (US)

(72) Inventors: Rachid M. Alameh, Crystal Lake, IL (US); Jarrett Simerson, Northbrook, IL (US); Martin Douglas Sawtell, Hopkinton, MA (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 19/357,946

(22) Filed: Oct. 14, 2025

(51) Int. Cl.
*G06F 3/0354* (2013.01)
*G06F 3/0346* (2013.01)
*G06F 3/038* (2013.01)
*G10L 17/22* (2013.01)

(52) U.S. Cl.
CPC ........ *G06F 3/03543* (2013.01); *G06F 3/0346* (2013.01); *G06F 3/0383* (2013.01); *G10L 17/22* (2013.01); *G06F 2203/0384* (2013.01)

(58) Field of Classification Search
CPC .. G06F 3/03543; G06F 3/0346; G06F 3/0383; G06F 2203/0384; G10L 17/22
See application file for complete search history.

(56) References Cited

U.S. PATENT DOCUMENTS 5,526,405 A * 6/1996 Toda .................. H04M 1/6041 379/432
2004/0243514 A1 12/2004 Wankmueller
2007/0130396 A1* 6/2007 Yen ......................... G06F 3/021 710/62
2007/0216648 A1* 9/2007 Lo ....................... G06F 3/03543 345/163
2007/0266154 A1 11/2007 Ohta et al.
2008/0155655 A1 6/2008 Wankmueller
2010/0299724 A1 11/2010 Masiyowski et al.
2012/0078639 A1 3/2012 Kumar
2015/0140978 A1 5/2015 Zilmer et al.
2018/0047393 A1 2/2018 Tian et al.
(Continued)

FOREIGN PATENT DOCUMENTS

WO 2000/007087 A1 2/2000

*Primary Examiner* — Amit Chatly
(74) *Attorney, Agent, or Firm* — Prol Intellectual Property Law, PLLC; H. Kenneth Prol

(57) ABSTRACT

A method of routing videoconference audio data stream or an artificial intelligence (AI) assistant audio data stream to a wireless mouse during a videoconference call at an information handling system including, with a mouse microcontroller unit, executing a mouse authentication and input control agent to receive output from a sensor indicating that the wireless mouse has been lifted off of a surface and transmitting a signal to the information handling system to switch receiving audio input received during a videoconference call at the information handling system to a mouse microphone in the wireless mouse for either videoconference audio input or AI assistant audio input, and receiving output from one or more sensors indicating that the wireless mouse has been placed on the surface by the user and terminate receiving audio input from the mouse microphone at the wireless mouse and receive audio input at the information handling system.

20 Claims, 6 Drawing Sheets

(56) References Cited

U.S. PATENT DOCUMENTS

| | | | | |
|---|---|---|---|---|
| 2018/0047394 | A1 | 2/2018 | Tian et al. | |
| 2019/0013013 | A1 | 1/2019 | McLaren et al. | |
| 2020/0134151 | A1 | 4/2020 | Magi et al. | |
| 2020/0204565 | A1 | 6/2020 | Zhong et al. | |
| 2021/0373676 | A1 | 12/2021 | Jorasch et al. | |
| 2022/0083634 | A1 | 3/2022 | Chen | |
| 2022/0277747 | A1 | 9/2022 | Pair | |
| 2022/0351734 | A1 | 11/2022 | Brown | |
| 2022/0374604 | A1 | 11/2022 | Sivakumar et al. | |
| 2023/0161853 | A1* | 5/2023 | Nair | G06F 21/32<br>726/18 |
| 2023/0335139 | A1* | 10/2023 | Breton | G06F 3/167 |
| 2024/0004481 | A1 | 1/2024 | Jorasch et al. | |

* cited by examiner

SYSTEM AND METHOD FOR ROUTING AUDIO BETWEEN AN INFORMATION HANDLING SYSTEM AND A MOUSE

FIELD OF THE DISCLOSURE

The present disclosure generally relates to executing machine readable code instructions for transferring audio output and/or input from an information handling system to a wireless mouse having audio capabilities. The present disclosure more specifically relates systems and methods for routing audio to or from a wireless mouse during a videoconference call conducted at an information handling system based on whether the wireless mouse is lifted off of a surface or not or distance from the hosting information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to conduct a videoconferencing call and include video or audio capabilities. In order to provide input during execution of machine readable code instructions of software applications, such as during the videoconference call, a wireless mouse and other input/output (I/O) devices may be included that are accessible to the user.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
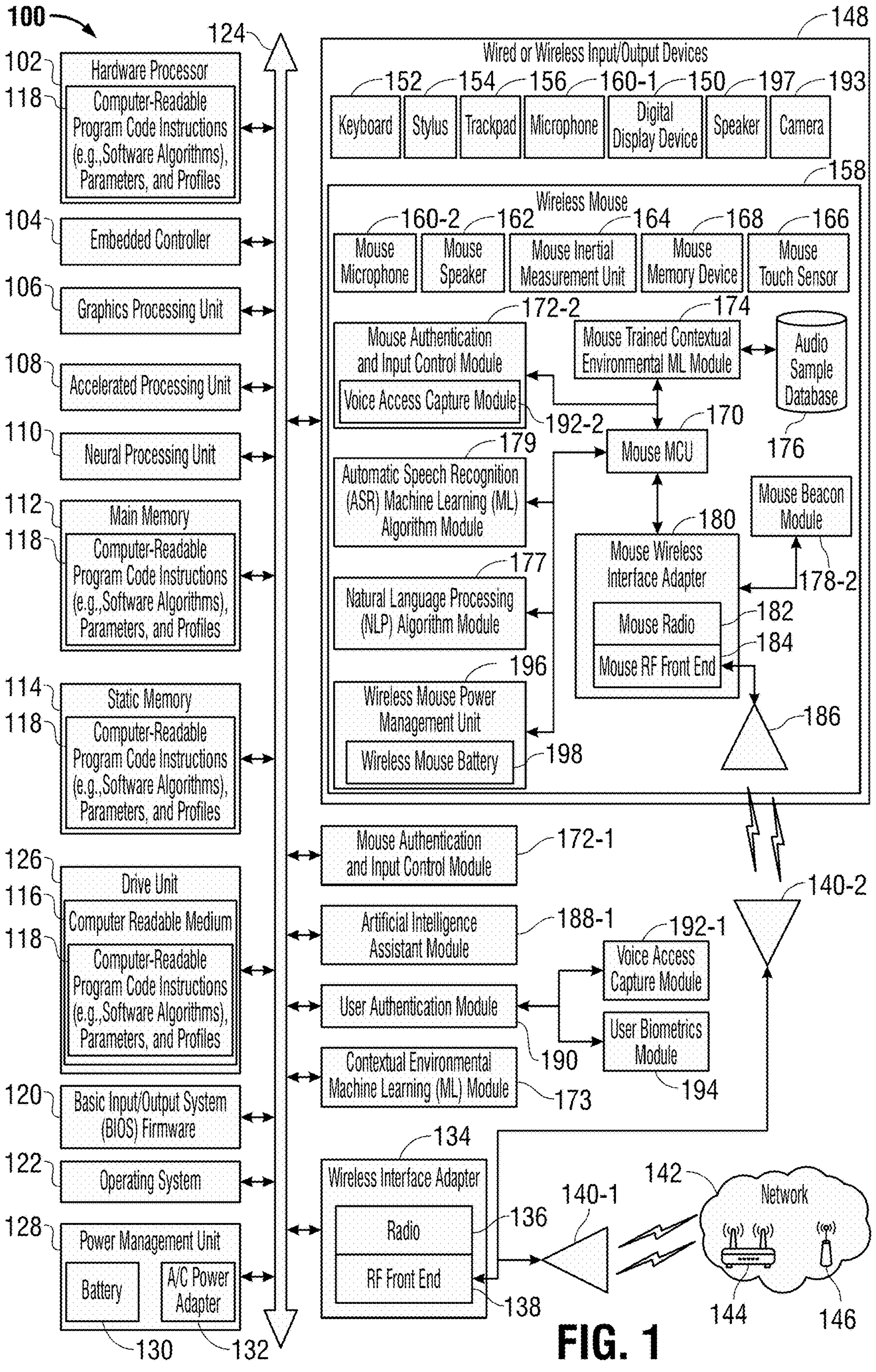
FIG. 1 is a block diagram illustrating an information handling system operatively coupled to a wireless mouse with audio capabilities and including a mouse authentication and input control module and agent to route audio to a wireless mouse upon initiation during a videoconference call at an information handling system according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may include any number of a plurality of input and output (I/O) devices that allow a user to interact with the information handling system. Among these I/O devices includes a wireless mouse such as used for cursor control or other inputs. The wireless mouse may provide freedom to the user by eliminating a wired cord that would otherwise keep the user at and in front of the information handling system during operation and input at the information handling system. Still, a user may wish to engage in multi-tasking while engaging with the information handling systems. An opportunity to engage in multiple tasks arises when the user is attending, for example, a videoconference operating with videoconference software executing via the information handling system. Here, the user may not be required to engage in any other task at the information handling system during the videoconference except to engage in a conversation with other attendees, although inputs such as cursor control or keyboard inputs may be required at times. At other times, only conversation is required of the user in the videoconference. As such, the user may wish to get up from in front of the information handling system and engage in other tasks such as pouring a cup of coffee in another room, retrieving printed copies from a printer in another location, closing a door, or the like.

However, by leaving the location of the information handling system, audio input at a microphone of the information handling system and audio output from a speaker at the information handling system is not made available to the user.

Additionally, while the user is attending the videoconference session, the user may wish to know what is being discussed along with more details that would allow the user to engage in the conversation. Artificial intelligence has allowed users to retrieve data via searches or requests that describe, to any degree requested, details about a number of subjects. In some embodiments, this information is gathered by an AI assistant from various sources and may be provided to the user in a concise manner via a graphical user interface or a chatbot. However, accessing an AI assistant to quickly get more information may be difficult while the user is engaged with the others during the videoconferencing session and may be distracting. Additionally, current AI assistants utilizing a chatbot and microphone input may absorb data and voice input from the videoconferencing session overlapped with user's request and provide errant details or errors related to the specific topic being discussed or the information requested.

To address these and other issues, the present embodiments of the specification herein describe a hardware processor executing machine readable code instructions of a mouse authentication and input control module on an information handling system operating with a wireless mouse having audio capabilities for method of routing audio to a wireless mouse during a videoconference call at an information handling system. A mouse hardware microcontroller unit (MCU) at the wireless mouse executes machine readable code instructions of a mouse authentication and input control agent on the wireless mouse to detect and report when the wireless mouse has been lifted, distance of the wireless mouse from the host information handling system, and other inputs relating to routing of audio input and output through the wireless mouse via an onboard speaker or microphone. This routing of audio input and output may be done so that a user may multi-task or engage with an AI assistant being executed on the information handling system. As described herein, the wireless mouse may include its own microphone and speaker such that the user may interact with the wireless mouse to engage in the videoconferencing session when the user lifts the wireless mouse from off of a surface that the wireless mouse is resting on. The lifting of the wireless mouse may be detected by a mouse inertial measurement unit (IMU). Output from the mouse IMU may be provided to the mouse microcontroller unit (MCU) that interprets this output as indicative of the user wanting to interact with the videoconferencing session via the audio input and output capabilities of the wireless mouse and transmits such an indication to the information handling system hosting the videoconferencing or other media software application.

In an embodiment, the method of executing machine readable code instructions of a mouse authentication and input control module and agent may include allowing for both audio input and output at the wireless mouse from the hosting information handling system when the user picks up the wireless mouse. In a further embodiment, the method of executing machine readable code instructions of a mouse authentication and input control module and agent may trigger allowing for both audio input and output at the wireless mouse from the hosting information handling system when the user picks up the wireless mouse and when the wireless mouse is detected as having been moved greater than a threshold distance from the hosting information handling system. These embodiments allow the user to walk away from the information handling system and engage in other activities with the wireless mouse having audio capabilities and without leaving the videoconference or missing portions of the same. In some embodiments, if the user sets the wireless mouse down on a surface beyond a threshold distance from the hosting information handling system, the voice input of the user may be used by a mouse authentication and input control module to authorize that the user is still engaged with the conversation by detecting the voice input of the user and continue to route the audio input and output through the wireless mouse. In other embodiments, if the user sets the wireless mouse down on a surface within a threshold distance of the hosting information handling system, both audio input and output may no longer be routed to the wireless mouse and return instead to the hosting information handling system. In an embodiment, while the audio is routed to the wireless mouse, the computer audio may be muted.

In several embodiments, the voice input audio of the user may be used by a mouse authentication and input control module to authorize that the user is still engaged with the conversation at the information handling system by detecting the voice input audio of the user and continue to route the audio input and output through either the wireless mouse audio capabilities or via the information handling system during the videoconferencing session depending on the movement of the wireless mouse or distance of the wireless mouse from the hosting information handling system. The wireless mouse, in an embodiment, may include a trained mouse environmental contextual ML algorithm module that, when executed by the mouse MCU, compares the voice input audio of the user to contextual audio samples stored on the mouse memory device to maintain authentication with the user. A timer may be set to provide time for the user to maintain authentication or re-authenticate the user during operation of the wireless mouse in this state. Where, however, the wireless mouse is detected to be within the threshold distance and the wireless mouse is set onto a surface, the input and output of audio may be transferred from the wireless mouse to the information handling system and its microphone and speakers. In such an embodiment, the voice input audio of the user is compared to contextual audio samples stored on the information handling system memory device by the machine readable code instructions of the user authentication module to maintain authentication with the user.

In another embodiment of the present disclosure, the lifting of the wireless mouse may be detected by mouse MCU executing the mouse authentication and input control agent initiate a signal to the hardware processor of the information handling system to execute machine readable code instructions of the mouse authentication and input control module to initiate an AI assistant module. In this embodiment, the mouse authentication and input control module may mute the microphone at the information handling system while the speakers at the information handling system still provide audio output of the videoconferencing session. In other embodiments, the mouse authentication and input control module may reduce the volume of or mute the speakers at the information handling system outputting audio of the information handling system. At this point the audio input may be routed through the mouse microphone to the AI assistant module executing on the information handling system with the user being allowed to interact with the AI assistant in order to, for example, ask clarifying questions as to what is being presented onscreen or what is being said while the videoconference is ongoing. The execution of machine readable code instructions of the mouse authentication and input control module at the information handling system establishes a secondary audio data exchange to allow the user to engage in a side conversation with the AI assistant while still attending and engaging in the videoconferencing session. Triggering the AI assistant may occur from detected movement of the wireless mouse, such as picking up the wireless mouse in one embodiment. In another embodiment, such as where the above embodiment of ongoing audio engagement with the videoconference via the wireless mouse may also be available, detected movement of the wireless mouse and maintained location within a threshold distance of the hosting information handling system or a detected gesture such as shaking or depressing a button may be reported to the mouse authentication and input control module to trigger the AI assistant. The movement of the wireless mouse, in an embodiment, reported to the mouse authentication and input control module at the information handling system to trigger the AI assistant may also allow a user to access data presented by the AI assistant on the digital display device of the information handling system via a graphical user interface presented there.

In an embodiment, the user may engage in a gesture or other action such as a selection on a GUI presented on the digital display device in order to transition to and from or toggle between the wireless mouse operating as an AI assistant input device or operating as the audio input and output device. In an embodiment, a transition gesture such as a rapid shaking of the wireless mouse, as detected by the mouse IMU, may perform this toggling so that a user may better engage with the videoconferencing session as described above.

The present systems and methods allow for a user to multi-task during a videoconferencing session without interrupting others who may also be participating. Indeed, by lifting the mouse, the user may still provide audio input via the mouse microphone and mouse speakers as the user walks away from the information handling system via rerouting of the audio input and output via execution of the mouse authentication and input control module to the wireless mouse with audio capabilities. Still further, without bothering other users on the videoconferencing call, the user may further investigate and get more details on the subject matter being presented during that session in another embodiment via triggering the AI assistant module via reporting movement and/or lifting of the mouse, distance or gesture from the mouse to the mouse authentication and input control module executing at the information handling system. This allows the user to engage in further studying while the conversation is allowed to continue without the user bothering others. Thus, the user may engage in a deeper or more informed discussion during the videoconferencing session such that more can be accomplished than would otherwise have been possible without the wireless mouse having audio capabilities and the execution of machine readable code instructions of the mouse authentication and input control module to enable seamless transition to and use of AI assistant interaction in embodiments herein.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 144, a base station transceiver 146, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system within a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Computer readable code instructions stored in main memory 112 (e.g., RAM) may be accessible by hardware processing resources using that main memory 112. Machine readable code instructions stored in static memory 114, main memory 112, or drive unit 126 may be involved in invoking such machine readable code instructions to main memory 112 according to embodiments herein. Additional components of the information handling system 100 may include one or more storage devices such as static memory 114 or drive unit 126. The information handling system 100 may include or interface with one or more communications ports for communicating with external devices, as well as various wired or wireless input and output (I/O) devices 148, such as a wireless mouse 158, a trackpad 156, a stylus 154, a keyboard 152, a standalone digital display device 150, a microphone 160, or any combination thereof. Portions of an information handling system 100 may themselves be considered information handling systems 100.

Information handling system 100 may include devices or modules that embody one or more of the devices or execute instructions for one or more systems and modules. The information handling system 100 may execute machine readable code instructions (e.g., software algorithms) parameters, and profiles 118 that may operate on servers or systems, remote data centers, or on-box in individual client information handling systems according to various embodiments herein. In some embodiments, it is understood any or all portions of machine readable code instructions (e.g., software algorithms) parameters, and profiles 118 may operate on a plurality of information handling systems 100.

The information handling system 100 may include the hardware processor 102 such as a central processing unit (CPU) or other hardware processing resource (e.g., 104, 106, 108, 110). Any of the hardware processing resources may operate to execute computer readable code instructions that are either firmware or software code, such as those software systems and modules described herein. Moreover, the information handling system 100 may include memory such as main memory 112, static memory 114, and disk drive unit 126 (volatile (e.g., random-access memory, etc.), nonvolatile memory (read-only memory, flash memory etc.) or any combination thereof or other memory with computer readable medium 116 storing machine readable code instructions (e.g., software algorithms) parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various wired or wireless I/O devices 148 as well as between hardware processors 102, an EC 104, the operating system (OS) 122, the basic input/output system (BIOS) 120, the wireless interface adapter 134, or a radio module, among other components described herein. In an embodiment, the hardware processor 102, EC 104, GPU 106, NPU 110, APU 108, and/or others may execute one or more bus drivers in order to transmit this data between the information handling system 100 and the wired or wireless input/output devices 148 described herein. In an embodiment, the information handling system 100 may be in wired or wireless communication with the wired or wireless I/O devices 148 such as a keyboard 152, the wireless mouse 158, standalone digital display device 150, stylus 154, trackpad 156, microphone 160, among other peripheral devices. In an embodiment, for example, information handling system 100 may execute machine readable code instructions of software applications or firmware to generate video data, such as via a GPU, for images to be presented on the standalone digital display device 150. The video data may be transmitted to the standalone digital display device 150 via wired or wireless communication to present the images according to embodiments herein.

In an embodiment, the information handling system 100 may include a digital display device 150. In an embodiment, the digital display device 150 may function as a liquid crystal display (LCD), an organic light emitting diode (OLED), a flat panel display, or a solid-state display. It is appreciated that the digital display device 150 may be wired or wireless to allow a user to increase the desktop area by extending the desktop in an embodiment. In some embodiments, the information handling system 100 may include a digital display device that is integrated such as with a laptop information handling system. Additionally, as described herein, the information handling system 100 may include or be operatively coupled to a cursor control device (e.g., a trackpad 156, or gesture or touch screen input), a stylus 154, the wireless mouse 158, and/or a keyboard 152, among others that allows the user to interface with the information handling system 100 via the standalone digital display device 150. Information handling system 100 may also be operatively coupled to a wired or wireless input/output device 148 or other hardware devices that may include a hardware processing device such as a hardware processor, microcontroller, or other hardware processing resource. Various drivers and hardware control device electronics may be operatively coupled to operate the wired or wireless I/O devices 148 according to the embodiments described herein. The present specification contemplates that the wired or wireless I/O devices 148 may be wired or wireless.

A network interface device of the information handling system 100 may be wired or wireless such as shown with wireless interface adapter 134 that can provide wireless connectivity among devices such as with Bluetooth® or to a network 142, e.g., a wide area network (WAN), a local area network (LAN), wireless local area network (WLAN), a wireless personal area network (WPAN), a wireless wide area network (WWAN), or other network. In embodiments described herein, the wireless interface device 134 with its radio 136, RF front end 138 and antenna 140 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, a WAN, WWAN, LAN, and WLAN may each include an AP 144 or base station 146 used to operatively couple the information handling system 100 to a network 142 via a wireless interface adapter 134. In a specific embodiment, the network 142 may include macro-cellular connections via one or more base stations 146 or a wireless AP 144 (e.g., Wi-Fi), or such as through licensed or unlicensed WWAN small cell base stations 146. Connectivity may be via wired or wireless connection. For example, wireless network wireless APs 144 or base stations 146 may be operatively connected to the information handling system 100. Wireless interface adapter 134 may include one or more RF (RF) subsystems (e.g., radio 136) with transmitter/receiver circuitry, modem circuitry, one or more antenna RF (RF) front end 138 circuits, one or more wireless controller circuits, amplifiers, antennas 140 and other circuitry of the radio 136 such as one or more antenna ports used for wireless communications via multiple radio access technologies (RATs). The radio 136 may communicate with one or more wireless technology protocols.

In an embodiment, the wireless interface adapter 134 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, Bluetooth® standards, proprietary RF protocol, or similar wireless standards may be used. Wireless interface adapter 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 134 can represent an add-in card, wireless network interface module that is integrated with a main board of the information handling system 100 or integrated with another wireless network interface capability, or any combination thereof.

In some embodiments, a hardware processing resource executes machine readable code instructions of software or firmware on the wireless mouse 158, to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit (ASIC). Accordingly, the present system encompasses a hardware processing resource executing machine readable code instructions of software or firmware as well as hardware implementations or any combination.

In accordance with various embodiments of the present disclosure, the methods described herein may be implemented by firmware or software programs executable by a hardware controller 164 or a hardware processor system on-board the wireless mouse 158 such as the mouse microcontroller unit (MCU) 170. Further, in an exemplary, non-limited embodiment, the information handling system may execute software or firmware via hardware processing resources 102, 104, 106, 108, or 110 to interface with output from the wireless mouse 158 and may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes machine readable code instructions, parameters, and profiles 118 or receives and executes machine readable code instructions, parameters, and profiles 118 responsive to a propagated signal, so that a hardware device connected to a network 142 may communicate voice, video, or data over the network 142. Further, the machine readable code instructions, parameters, and profiles 118 may be transmitted or received over the network 142 via the network interface device or wireless interface adapter 134.

The information handling system 100 may include a set of machine readable code instructions, parameters, and profiles 118 that may be executed to cause the computer system to perform any one or more of the methods or computer-based functions disclosed herein. For example, machine readable code instructions, parameters, and profiles 118 may be executed by a hardware processor 102, GPU 106, EC 104, APU 108, NPU 110, or any other hardware processing resource and may include software agents, or other aspects or components used to generate video data for presentation of images at the standalone digital display device 150 during execution of the methods and systems described herein. Various software modules comprising application machine readable code instructions, parameters, and profiles 118 may be coordinated by an operating system (OS) 122, and/or via an application programming interface (API) include a unified device API described herein. An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, or other hardware processing resource device to perform the processes described herein. Similarly, main memory 112 and static memory 114 may also contain a computer-readable medium for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, APU 108, NPU 100, or GPU 106 of information handling system 100. In an embodiment, because the wireless mouse 158 may operate separate from the processing resources of the information handling system 100, the wireless mouse 158 may access a mouse memory device 168 that may maintain the machine readable code instructions described herein thereby allowing the wireless mouse 158 to operate, at least some of, the systems and methods described herein without the need for external hardware, data storage, and machine readable code instructions resources.

Main memory 112 or other memory of the embodiments described herein may contain computer-readable medium (not shown), such as RAM in an example embodiment. An example of main memory 112 includes random access memory (RAM) such as static RAM (SRAM), dynamic RAM (DRAM), non-volatile RAM (NV-RAM), or the like, read only memory (ROM), another type of memory, or a combination thereof. Static memory 114 may contain computer-readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 128 (a.k.a. a power supply unit (PSU)). The PMU 128 may include a hardware controller and executable machine-readable code instructions to manage the power provided to the components of the information handling system 100 such as the hardware processor 102 and other hardware components described herein. The PMU 128 may control power to one or more components including the one or more drive units 126, the hardware processor 102 (e.g., CPU), the EC 104, the GPU 106, the APU 108, the NPU 110, the video/graphic display device 150, or other wired or wireless I/O devices 148 such as the wireless mouse 158, the stylus 154, the keyboard 152, and the trackpad 156 and other components that may require power when a power button has been actuated by a user. In an embodiment, the PMU 128 may monitor power levels and be electrically coupled to the information handling system 100 in embodiments herein to provide this power. The PMU 128 may be coupled to the bus 124 to provide or receive data or machine-readable code instructions. The PMU 128 may regulate power from a power source such as the battery 130, or AC power adapter 132. In an embodiment, the battery 130 may be charged via the AC power adapter 132 and provide power to the components of the information handling system 100, via wired connections, or when AC power from the AC power adapter 132 is removed. It is appreciated that the wireless mouse 158 may also include a wireless mouse PMU 196 that includes a wireless mouse battery 198 used to power, for example, the moues MCU 170 and the mouse memory device 168. Similarly, the mouse MCU 170 may regulate power from the wireless mouse battery 198 to power the various hardware components of the wireless mouse 158 described herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 116 can store information received from distributed network resources such as from a cloud-based environment. A digital file attachment to an e-mail or other self-contained information archive or set of archives may be considered a distribution medium that is received by and stored in a tangible non-transitory machine readable storage medium. Accordingly, the disclosure is considered to include any one or more of a machine readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described in embodiments herein, the information handling system 100 is operatively coupled to a wireless mouse 158 further having audio capabilities of a mouse speaker 162 and a mouse microphone 160-2. As described herein, the wireless mouse 158 may be configured to provide cursor input to the information handling system 100 such that a user may select objects on a graphical user interface (GUI) presented on the digital display device 150 of the information handling system 100. The wireless coupling of the wireless mouse 158 to the information handling system 100 may be accomplished via the wireless interface adapter 134 described herein and the mouse wireless interface adapter 180 that also includes a mouse radio 182, mouse RF front end 184, and mouse antenna 186 thereby allowing for wireless communication between the two devices.

In addition to providing cursor input at the information handling system 100, the wireless mouse 158 may also include the capability of detecting the voice input audio of the user via the mouse microphone 160-2. A voice access listening system described herein may include the mouse microphone and a mouse MCU 170 executing machine readable code instructions of a mouse authentication and input control module 172-2. In an embodiment, this voice access listening system may prevent access to both the information handling system 100 and the wireless mouse 158 by voice access attempts. In an embodiment, the information handling system 100 executes machine readable code instructions of a voice access capture module 192-1 and the wireless mouse 158 may also execute its own voice access capture module 192-2. Execution of the voice access capture modules 192-1, 192-2 by the respective hardware processors (e.g., hardware processor 102 or mouse MCU 170) may cause the hardware processors to evaluate both the context in which the information handling system 100 is operating by a contextual environment machine learning (ML) module 173, for example, as well as the background acoustical environment of the information handling system 100 and audio analysis of a voice picked up by the microphone 160-1 of the information handling system 100 or the mouse microphone 160-2 when a recorded voice access attempt is made attempting to gain access to the information handling system 100 or provide input to the information handling system 100. In an embodiment, the execution of the voice access capture modules 192-1, 192-2 may also be used to authenticate and authorize the user to provide input and engagement with the wireless mouse 158 and information handling system 100 as described herein. By using a contextual environment ML module 173 for example, the information handling system 100 may evaluate this environmental context in which the information handling system 100 is operating from sensors reporting to the hardware processors, evaluate the audio received at the microphones 160-1 or 160-2, and provide a context matching score determination. A context matching score may be used with a voice background matching score from, for example, a trained mouse environmental contextual machine learning (ML) algorithm module 174, to determine whether the audio received at the mouse microphone 160-2 of a voice access attempt meets a threshold access authorization confidence score that an authorized user's voice is being used to access the information handling system 100 and provide output to the information handling system 100. Such a threshold access authorization confidence score may require a 90%, 95%, or 98% confidence that the voice access attempt is genuine in an example embodiment. Any threshold access authorization confidence score is contemplated for comparison against a combined voice background matching score and a context matching score. It is appreciated that an audio sample database 176 within the wireless mouse 158 and any other similar storage device in the information handling system 100 may be maintained for these comparisons purposes.

It is appreciated that the voice access listening system of the wireless mouse 158 described herein may detect any type of voice of the user including under a variety of environmental backgrounds. In an embodiment, the mouse voice access capture module 192-2 may capture the passive voice of the user under a variety of conditions. The passive voice of a user may be any type of normal random speech that does not necessarily require the user to say a specific word and which may be monitored by the mouse voice access capture module 192-2 and the mouse microphone 160-2. Voice access inputs with this passive voice of the user may be used to both authenticate the user and, via an automatic speech recognition (ASR) machine learning (ML) algorithm 179, convert the spoken input into a textual representation of the detected speech. Once converted, a natural language processing (NLP) algorithm module 177 may analyze the recognized text to determine semantic meaning, identify speaker intent, and filter whether the content is related to an actionable command or simply background conversation.

Additionally, or alternatively, the voice access listening system may be configured to capture active voice input of the user. In this embodiment, the active voice comprises deliberate user speech that does require the utterance of a particular word or phrase such as a "wake word." Further, in some embodiments, the disclosed system allows the particular word or phrase to be private or secret to the user that amounts to a user-known name or spoken codeword, thereby providing an additional security layer unlike a commonly known wake words. When the active voice phrase, whether a "wake word" or a secret code word, is spoken by the user, the mouse voice capture access module 192-2 activates with the mouse microphone 160-2 to pick up the user's voice and the audio of the user's voice is passed onto the voice access listening system for authentication of the user for the assigned security level for the wireless mouse 158. Further, that or additional voice input may then access a NLP algorithm 177 to parse and treat the subsequent speech as a command sequence. Here, an automatic speech recognition (ASR) algorithm 179 may transcribe the voice input into text format for wake word matching. Further, the ASR algorithm 179 may transcribe the voice input for the NLP algorithm module 177 to interpret the user's voice input as chat bot input instructions or commands for the operatively coupled information handling system 100. These interpreted instructions may then be executed by the information handling system 100 in accordance with the user's assigned access rights and security level described herein. Thus, where the specification describes the use of the user's passive voice as input into a trained contextual environmental ML model 174, it is appreciated that the user's active voice may also be used in similar embodiments as described above and the present specification contemplates such use of an active voice system in place of a passive voice system.

In an embodiment, the voice access listening system described herein that includes, at least, the mouse authentication and input control agent 172-2 of the wireless mouse 158, may coordinate wirelessly with the information handling system authentication and input control module 172-1 of the information handling system 100 to selectively allow and prevent access to both the information handling system 100 and the wireless mouse 158 by voice access attempts. In one embodiment, the information handling system 100 executes computer-readable program code of a voice access capture module 192-1 and the wireless mouse 158 to also execute its own computer-readable program code of a mouse voice access capture module 192-2 to selectively authenticate users via captured user voice input at microphone 160-1 at the same time or in parallel with the wireless mouse microphone 160-2 in some embodiments described herein.

As described in some embodiments herein, the wireless mouse 158 may be used as an audio input and/or output device. In one embodiment, the wireless mouse 158 may be used as an audio input and/or output device after the wireless mouse 158 has been lifted from off of a surface such as a tabletop or mouse pad by the user. In order to determine that the wireless mouse 158 has been lifted off from the surface, a plurality of sensors may be used. In an embodiment and in those examples of wireless mice 158 that include a light-emitting diode (LED) or laser optical technology, inertial measurement unit outputs (e.g., mouse IMU164), capacitive, and the like, the sensor may be the LED or laser optical technology that can detect when the surface is not flush or abutting the bottom surface of the wireless mouse 158. It is appreciated that the lifting of the wireless mouse 158 off of any surface, whether horizontal or not, may be used in the methods described herein.

Alternatively, or additionally, the sensors may include a mouse inertial measurement unit (IMU) 164. The mouse IMU 164 may include an accelerometer and gyroscope that can determine the orientation and movement of the wireless mouse 158 as it is moved both over the surface and within three-dimensional (3D) space as the user lifts the wireless mouse 158 off of the surface. Additionally, or alternatively, the wireless mouse 158 may include a mouse touch sensor 166. The mouse touch sensor 166 may be used to determine if the user is physically holding the wireless mouse 158 such that, along with the output data from the mouse IMU 164, can verify that the user is in transit with the wireless mouse 158.

In an embodiment, the wireless mouse 158 may also include a mouse beacon module 178-2 (e.g., an ultra-wide band (UWB) or other ranging technology when installed in both the information handling system 100 and wireless mouse 158) to operate with the mouse wireless interface adapter 180 and mouse radio 182, mouse RF front end 184 and an antenna 186. The mouse beacon module 178 may be operatively coupled to the mouse wireless interface adapter 180. In an embodiment, the mouse beacon module 178 may operate to determine a distance of the wireless mouse 158 from the information handling system 100 in an exchange with a mouse beacon module 178-1 operating with the wireless interface adapter 134 at the information handling system to transmit a beacon in either direction or to exchange beacons to determine distance. As such, in one embodiment, the mouse beacon modules 178-1 and 178-2 may include an ultra-wideband (UWB) ranging beacon the transmits very short-duration pulses across a wide frequency spectrum (e.g., 3.1 to 10.6 GHZ) transmitted from one side and received at the other (e.g., the information handling system 100 and wireless mouse 158). The wireless mouse 158 and information handling system 100 may, in an example embodiment, exchange other beacon pulses and use a time-of-flight (ToF) or round-trip time (RTT) to calculate the distance between them in other embodiments. Alternatively, the mouse beacon module 178 may include a Bluetooth Low Energy® (BLE) RSSI-based beacon. In this example, the wireless mouse 158 may periodically transmit a BLE advertisement packet with the information handling system 100 estimating a proximity of the wireless mouse 158 to the information handling system 100 using a received signal strength indicator (RSSI).

As described herein, the hardware processing resource, such as hardware processor 102 or others, may execute machine readable code instructions of a videoconferencing application for a user in order to initiate or conduct a videoconferencing call with other remote users. During this videoconferencing call, the user may want to get up and move around in order to engage in multi-tasking activities. These other activities may include retrieving items such as printed materials from a different room, getting a snack from a kitchen area, among other activities that may draw the user away from being present in front of the information handling system 100. The user may still want to interact, at least verbally, with the other participants on the videoconference session although she is not physically present in front of the digital display device 150 and camera 193 of the information handling system 100.

Previous to the user engaging with the wireless mouse 158 to provide input to the information handling system 100, the user may be authenticated via a user authentication module 190 of the information handling system 100. The machine readable code instructions of the user authentication module 190 may be executed by, for example, the hardware processor 102 in order to allow access to the information handling system 100 by the user along with the user biometrics module 194, contextual environmental ML module 173, and a voice access capture module 192-1. This may include the execution of a user biometrics module 194 to receive and compare biometrics of the user (e.g., image of user's face, fingerprint, etc.) to store biometric data in a data storage device such as the static memory 114. Similarly, in an embodiment, the hardware processor 102 may execute machine readable code instructions of a voice access capture module 192-1. Execution of the voice access capture module 192-1 may initiate the capture and comparison of a user's voice, including cadences, tones, and other voice characteristics, as described herein in order to identify the user from normal random speech of the user at the microphone 160-1 rather than requiring specific code phrase be spoken in some embodiments. Moreover, execution of the machine readable code instructions of the contextual environmental ML module 173 may assist in determination of contexts such as location or background of the information handling system and the user as further authentication in other embodiments.

As the user is authenticated via the user authentication module 190, this authentication may be passed to the wireless mouse 158 and maintained by the mouse MCU 170 on a mouse memory device 168 for example. Thus, as the wireless mouse 158 is being used as a cursor movement input device while on the surface, this authentication data may be transferred to the wireless mouse 158 for updated authentication data. Still further, the hardware processor 102 or other hardware processing resource may execute machine readable code instructions of the user authentication module 190 to access one or more audio samples of the user's voice in different contexts maintained on the static memory 114 for comparison of currently captured voice by the user voice capture module 192-1 to the audio samples previously captured and verified. These user audio samples may be acquired by the microphone 160-1 of the information handling system and the hardware processor 102 or other hardware processing resource such as NPU 110 may execute machine readable code instructions of the contextual environmental ML module 173 and the voice access capture module 192-1 within the user authentication module 190 to determine and associate those voice samples with a user identified via biometrics captured by the user biometrics module 194 or with an image of the user captured via camera 193, such as during a videoconferencing session. The user audio samples may be captured in various contexts and stored in static memory 114 or other memory. As the user's voice is passively captured in ongoing conversation such as during a videoconference and whether in quiet and noisy environments, any currently captured voice may be compared to those audio samples via the contextual environmental ML module 173 and the voice access capture module 192-1 on the information handling system 100 as part of identifying and authorizing a user for continued access or rerouting of audio data or establishing a secondary audio stream via execution of the mouse authentication and input control module 172-1. Additionally, those voice samples or some subset thereof are also available on the mouse audio sample database 176 for use during execution of machine readable code instructions of a trained mouse environmental contextual ML algorithm module 174 and voice access capture module 192-2 for receiving or activating a rerouted audio data stream or establishing a secondary audio data stream on the mouse during later steps in the methods described in embodiments herein.

In one embodiment, as the user lifts the wireless mouse 158 from off of a surface, the mouse IMU 164 may detect this removal and cause the wireless mouse 158 to operate as an audio input and output device via mouse microphone 160-2 and mouse speaker 162 instead of just as a cursor control input device. As this occurs, the mouse microcontroller unit (MCU) 170 may receive a sensor indication from the mouse inertial measurement unit (IMU) 164 and execution of machine readable code instructions of the mouse authentication and input control agent 172-2 may cause a signal to be sent, wirelessly, to the information handling system 100 for the information handling system 100 to execute machine readable code instructions of the mouse authentication and input control module 172-1 to pause operation of the microphone 160-1 and the speaker 197 on the information handling system so that the wireless mouse 158 may be used for these purposes. Again, it is appreciated that as the wireless mouse 158 is lifted from off of the surface, the audio at the information handling system 100 may be muted such that the audio input is routed to the mouse microphone 160-2 and audio output is routed to the mouse speaker 162. Thus, in an embodiment, the lifting of the wireless mouse 158 from off of the surface may be a trigger for the information handling system 100 to complete this routing of audio input and output through the wireless mouse 158 by transmission and request of the audio via the wireless connection between the information handling system 100 and wireless mouse 158. In an embodiment, execution of the machine readable code instructions of the mouse authentication and input control module 172-1 may execute on the hardware processor 102 or other hardware processing resource to deactivate operation of the microphone 160-1 and speaker 197 of the information handling system 100 upon receiving this signal. At this point, the hardware processing resource, such as hardware processor 102 and any audio codec, routes the audio data from the videoconference session wirelessly via wireless interface adapter 134 to the mouse microphone 160-2 and mouse speaker 162 of the wireless mouse 158 for audio input and audio output, respectively.

In an embodiment, execution of the machine readable code instructions of the mouse authentication and input control module 172-1 at the information handling system 100 may cause the authentication data associated with the authentication of the user at the information handling system 100 to be transferred to the wireless mouse 158 using the wireless interface adapter 134 along with any updated audio samples that may be used to reauthorize the user at the wireless mouse 158 where necessary. The audio samples may be stored within the audio sample database 176 of the wireless mouse 158. In this state, and after the rerouting of audio data stream wirelessly to the wireless mouse 158 from the information handling system, the user may walk away from the information handling system 100 and engage in those multi-tasking activities described herein such as continuing with a videoconference via the videoconferencing application executing at the information handling system 100.

In another embodiment, after the user has taken the wireless mouse 158 away from the information handling system 100 during a videoconference session, the mouse IMU 164 and other sensors may be used to periodically or episodically determine whether the wireless mouse 158 is in continuous motion after the wireless mouse 158 has been lifted off of the surface. In an embodiment, continuous motion may include slight movement of the wireless mouse 158 within 3D space and may be sporadic or episodic movements within specified time intervals that indicates that the user is walking or otherwise moving with the wireless mouse 158 in the user's hand or micromotions of the user as detected by the mouse IMU 164 (e.g., user's breathing or heartbeat). Where the mouse MCU 170, receiving input from the mouse IMU 164, has determined that the wireless mouse 158 is in continuous motion, the authentication of the user via voice authentication received wirelessly from the information handling system is maintained at the wireless mouse 158 due to the transfer of authentication data from the information handling system 100 to the wireless mouse 158 upon detection of the wireless mouse 158 being removed from the surface by the user. As described herein, therefore, the user engagement with the information handling system 100 in order to be authenticated may allow for continuing authentication to be maintained after the user has lifted the wireless mouse 158 off of the surface. This lifting of the wireless mouse 158 from off of the surface as well as maintaining continuous motion carries the authentication status of the user until such a time that the user places the wireless mouse 158 on a surface and continuous motion is no longer detected.

It is appreciated that, during various embodiments herein, the mouse MCU 170 may use one or more of the wireless mouse beacon modules 178-1 and 178-2 operating at the information handling system 100 or the wireless mouse 158 to determine if the wireless mouse 158 is within a threshold distance from the information handling system 100. In one embodiment, this threshold distance may be set such that when the wireless mouse 158 is detected beyond the threshold distance, the information handling system 100 will route the audio data stream for video conference audio input and output to the wireless mouse 158 so that the user may both hear and be heard via the wireless mouse 158 during the videoconference session (e.g., 5 feet). If the wireless mouse 158 is detected within the threshold distance in other embodiments, the information handling system 100 will route the audio data stream audio input and output back to the information handling system 100 so that the user may both hear and be heard via the information handling system 100 during the videoconference session so long as the those sensors within the wireless mouse 158 have also detected that the wireless mouse 158 has been placed on the surface. It is appreciated that the threshold distance may be set to any distance, and the present specification contemplates these other distances.

In another embodiment, if the wireless mouse 158 is detected as lifted via the mouse IMU 164, execution of the mouse authentication and input control agent 172-2 may notify the mouse authentication and input control module 172-1 on the information handling system 100 and this may trigger execution of the artificial intelligence (AI) assistant module 188-1. The information handling system may execute the mouse authentication and input control module 172-1 according to embodiments herein to establish a secondary audio data stream with the wireless mouse 158 via the mouse authentication and input control module 172-2 executing there. In a particular embodiment, if the wireless mouse 158 is detected within the threshold distance via the wireless mouse beacon modules 178-1 and 178-2, the information handling system 100 will establish a secondary audio data stream for audio input and output with the wireless mouse 158 for the AI assistant module 188-1 while the primary audio stream continues at the information handling system 100. However, in such an embodiment, the microphone 160-1 may be muted and speaker 197 muted or reduced in volume so that the user may communicate with the AI assistant module 188-1 while also hearing the information handling system 100 during the videoconference session. However, if the wireless mouse 158 is detected outside the threshold distance via the wireless mouse beacon modules 178-1 and 178-2 in other embodiments, the information handling system 100 will not use any secondary audio data stream and will reroute the primary audio data stream for the videoconference audio input and output to the wireless mouse 158 so that the user may communicate via the wireless mouse 158 and its mouse speaker 162 and mouse microphone 160-2 in an embodiment. Again, in such an embodiment, the microphone 160-1 and speaker 197 may be muted at the information handling system 100 for privacy so the user only communicates with the wireless mouse 158 when in a remote mouse communication mode.

It is appreciated that when the user is engaged in these multi-tasking activities, the user may wish to, at least temporarily, place the wireless mouse 158 down while in a remote mouse communication mode in various embodiments herein. Again, the mouse IMU 164 and other sensors may detect the placement of the wireless mouse 158 on the surface. This creates a situation where the mouse MCU 170 determines that not only is the wireless mouse 158 not in continuous motion, but the wireless mouse 158 has been set onto a surface. The mouse MCU 170 may, at this time, also determine if the user and wireless mouse 158 are near the information handling system 100 (e.g., if the wireless mouse 158 is within or outside of the threshold distance). Where, for example, the user/wireless mouse 158 is within the threshold distance, the mouse MCU 170 may signal to the information handling system 100 to reroute audio input and output back to the microphone 160-1 and speaker 197, respectively, of the information handling system 100. This allows the hardware processor of the information handling system 100 to execute the user authentication module 190 to authorize the user. In an embodiment, previous authentication data once transferred to the wireless mouse 158 may be transferred back to the information handling system 100 to maintain the user's authentication. In an embodiment, re-execution of the user biometric module 194 and voice access capture module 192-1 may be done so as to reauthenticate the user so that the digital display device 150 once locked when the wireless mouse 158 was lifted off of the surface during a remote mouse communication mode, can be unlocked for the user to view the videoconference session in progress again.

It is appreciated that the user may place the wireless mouse 158 on a surface where the wireless mouse 158 is outside the threshold distance from the information handling system 100 in another aspect of an embodiment of a remote mouse communication mode. At this point, in order to maintain security at the information handling system 100 and videoconference session as well as with the wireless mouse 158, the authentication of the user may be revoked with the audio output and input at the wireless mouse 158 being stopped after a short time period such as five seconds, for example. In an embodiment, a timeout time may be started such that the user must, through voice detection, be authenticated. As described herein, the mouse MCU 170 may execute machine readable code instructions of the mouse authentication and input control module 172 in order to receive voice access input from the user and, via a trained mouse environmental contextual ML algorithm module 174, compare the currently-obtained voice access input to one or more audio samples within the audio sample database 176 in order to reauthorize the user. Voice access input may be received at the remotely communicating wireless mouse 158 even though the user may mute the mouse microphone 160-1 from receiving voice audio input to the videoconferencing session so as not to interrupt the other participants in an embodiment. In this embodiment, the muting of the mouse microphone 160-1 may be controlled by the mouse authentication and input control agent 172-2 to not send audio data wirelessly back to the information handling system but still be used for comparison to voice audio sample database 176 via trained mouse environmental contextual ML algorithm module 174. Where no voice access input can be obtained or authenticated, the videoconference session may be terminated in order to prevent unauthorized users from listening to or engaging in the videoconference session via the remote mouse communication mode. However, where the voice access input is received and authentication of the user can be achieved via the trained mouse environmental contextual ML algorithm module 174, the mouse authentication and input control agent 172-2 may continue streaming and playing or receiving audio data for the videoconference session even the wireless mouse 158 has been set on a surface and is outside of the threshold distance from the information handling system 100.

In another embodiment described in the present disclosure, the lifting of the wireless mouse 158 from off of the surface may cause a different action to be initiated. In an embodiment, as the user lifts the wireless mouse 158 off of the surface, the mouse MCU 170 may signal to the information handling system 100 that machine readable code instructions of an AI assistant module 188-1 is to be executed so that the user may engage with an AI assistant. At this point, audio input at the microphone 160-1 of the information handling system 100 is stopped muted and audio input at the mouse microphone 160-2 is initiated on a wirelessly established secondary audio data stream with the wireless mouse 158. The video conference may still continue to be played on speaker 197 or may be reduced in volume or muted in various embodiments when the AI assistant module 188-1 is initiated. Further, the display device 150 may still present the video conference while also allowing presentation of a graphical user interface (GUI) of the AI assistant module 188-1 in other embodiments. This allows a user to provide audio input via the wireless mouse 158 to the AI assistant module 188-1 so that those other attendees of the videoconference session cannot hear the user interacting with the AI assistant module 188-1 while continuing with access to some or all of the videoconferencing session.

In an embodiment, the user may interact with the AI assistant generated via execution of machine readable code instructions of the AI assistant module 188-1 via voice input as well as via cursor movements of the wireless mouse 158 within 3D space. In an embodiment, the mouse IMU 164 may be used to provide output to the information handling system 100 indicative of cursor movement on the AI assistant results displayed on the AI assistant GUI on the digital display device 150, such as for selection. In an embodiment, the mouse microphone 160-2 may continuously receive audio input from the user in order to verbally engage, via a secondary wireless audio data stream, with the AI assistant module 188-1 executing at the information handling system 100 in order to gain more information. In an example embodiment, the user may request more information related to what is being discussed or shown on the videoconference session. Instead of the user interfering with the flow of the discussion during the videoconference session, the user may lift the wireless mouse 158 and engage with the AI assistant module 188-1 via a secondary audio data stream wirelessly from the wireless mouse 158 and mouse microphone 160-2 and mouse speaker 162 in order to query the AI assistant module 188-1. In an example embodiment, the AI assistant module 188-1 may include execution of machine readable code instruction of a large language model (LLM) for access via user queries and providing AI assistant responses via a chatbot or the AI agent GUI.

When the user places the wireless mouse 158 back on the surface and the wireless mouse 158 is determined to be within the threshold distance from the information handling system 100, the secondary audio data stream may be terminated with wireless mouse 158 and its mouse microphone 160-2, and the microphone 160-1 of the information handling system 100 may be unmuted. Thus, without interrupting the videoconference session a user may verbally engage with the AI assistant of the information handling system 100 and reengage with the videoconference session when the requested information has been obtained by the user via the execution of the AI assistant module 188-1.

In another embodiment, the user may selectively switch between a first state where the wireless mouse 158 operates to provide audio input and output allowing the user to walk away from the information handling system 100 and communicate with an ongoing video conference session in a remote mouse communication mode and a second state where as secondary audio data stream is wirelessly established with the wireless mouse 158 for interaction with the AI assistant via execution of the AI assistant module 188-1 by a hardware processor (e.g., 102) of the information handling system 100 in an AI assistant mode when the wireless mouse 158 has been lifted. This switching or toggling between this first state of a remote mouse communication mode and second state of an AI assistant may be actuated by a user performing certain actions, such as pressing a hotkey button on the keyboard 152 or wireless mouse 158, selecting an option presented on a GUI presented on the digital display device 150, or performing a gesture with the wireless mouse 158 to select between the first state or second state such that both embodiments may be available to a user upon lifting the wireless mouse 158. In one example embodiment, the gesture may include a rapid shaking of the wireless mouse 158. In this embodiment, the user may lift the wireless mouse 158 off of the surface which will automatically initiate one of the first state or second state. The user may then shake the wireless mouse 158 as a gesture to switch to the other state. The mouse IMU 164 may detect this shaking which may be defined by a duration sufficient for the mouse IMU 164 to signal to the mouse MCU 170 executing the mouse authentication and input control agent 172-2 that a toggle or transition gesture or action has been received at the wireless mouse 158. The mouse authentication and input control agent 172-2 may then transmit a notification wirelessly to its counterpart mouse authentication and input control module 172-1 at the information handling system to either reroute the audio data stream from the video conference to the wireless mouse in a remote mouse communication mode on one state or to establish a secondary wireless audio data stream with the wireless mouse 158 and operate execution of the AI assistant module 188-1 in an AI assistant mode for the other state. It is appreciated that the user may perform this transition gesture at any time and any number of times after the wireless mouse 158 has been lifted from the surface in various embodiments.

The present systems and methods, therefore, allow for a user to multi-task during a videoconferencing session without interrupting others who may also be participating. Indeed, by lifting the wireless mouse 158, the user may still provide audio input via the mouse microphone 160-2 and mouse speaker 162 of the wireless mouse 158 as the user walks away from the information handling system 100 in a remote mouse communication mode with the ongoing video conference session in one embodiment. Still further in another embodiment, without bothering other users on the videoconferencing call, by lifting the wireless mouse 158 the user may trigger execution of the AI assistant module 188-1 with an available LLM algorithm or other AI assistant machine readable code instructions to further investigate and get more details on the subject matter being presented during that videoconference session. Various distances may be detected of the wireless mouse 158 from the information handling system 100 via one or more mouse beacon modules 178-1 or 178-2 to provide for execution of the machine readable code instructions of the mouse authentication and input control module 172-1 and agent 172-2 to seamlessly transition operation with the wireless mouse 158 between remove mouse communication mode, use of the AI assistant module 188-1, or returning to utilizing the information handling system 100 for the video conferencing session without the user interrupting the video conference session. This may also allow the user to engage in a deeper discussion during the videoconference session and also securely multitask remotely if needed via the execution of the mouse authentication and input control module 172-1 and mouse authentication and input control agent 172-2 operating between the information handling system 100 and wireless mouse 158 respectively.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
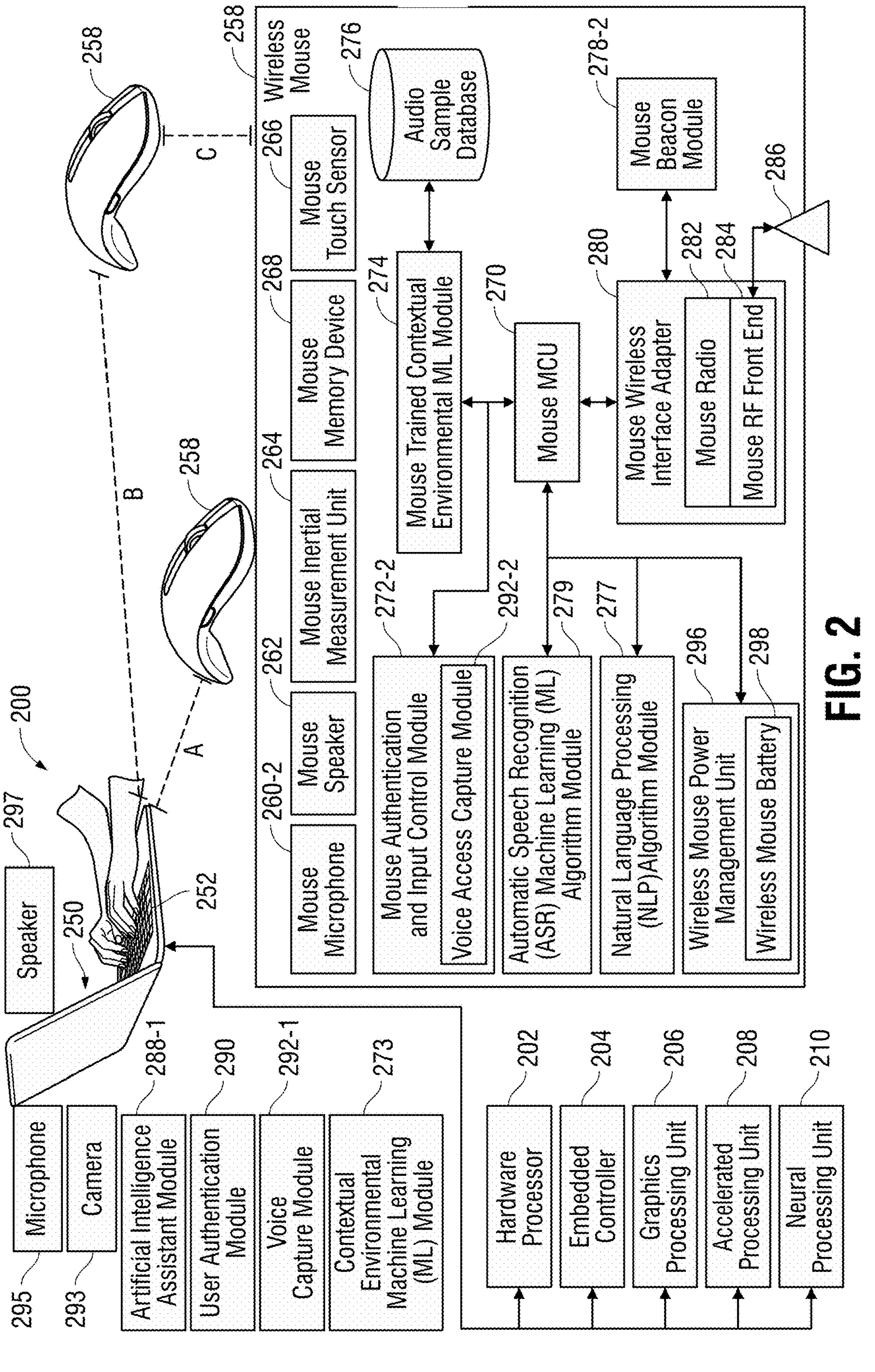
FIG. 2 is a graphic and block diagram illustrating an information handling system operatively coupled to a wireless mouse with audio capabilities and including a mouse authentication and input control module and agent to route audio to a wireless mouse upon initiation during a videoconference call at an information handling system according to another embodiment of the present disclosure.

FIG. 2 is a graphic and block diagram illustrating an information handling system 200 operatively coupled to a wireless mouse 258 including a mouse authentication and input control agent 272-2 to determine and receive routed audio data streams or establish secondary data streams to the wireless mouse 258 from the information handling system 200 during a videoconference call at the information handling system 200 according to another embodiment of the present disclosure. The wireless mouse 258 in FIG. 2 is shown to be in two distinct positions relative to the information handling system 200. In FIG. 2, the wireless mouse 258 is shown to be in in a first position that is a first distance "A" from the information handling system 200. In another example, the wireless mouse 258 is shown to be in a second position that is a second distance "B" away from the information handling system 200. It is appreciated that, at some point during the operation of the wireless mouse 258, the wireless mouse 258 may be lifted off of a surface a distance "C" resulting in the routing of audio to the wireless mouse 258 such as shown in FIG. 2.

A mouse beacon module 278-1 operating with the wireless interface adapter of information handling system 200 and a counterpart mouse beacon module 278-2 (e.g., using UWB ranging) at the mouse wireless interface adapter 280 may transmit or receive a beacon, such as a UWB ranging beacon or other wireless beacon, to determine the distance, A or B, of wireless mouse 258 from information handling system 200. In other embodiments, other types of radio beacons, infrared beacons, ultrasound beacons, or others may be used at either the wireless mouse 258, information handling system, or both to detect distances A or B. It is appreciated that the wireless mouse 258 executes machine readable code instructions of the mouse beacon module 278-2, with or without counterpart 278-1, to detect whether it is located within a threshold distance from the information handling system 200, for example at the first distance "A." In an embodiment, the wireless mouse 258 executes machine readable code instructions of the mouse beacon module 278-2, with or without counterpart 278-1, to detect whether it may be outside the threshold distance, for example at the second distance "B." Again, this threshold distance (e.g., 3 feet, 5 feet, or some other) may be set such that if the wireless mouse 258 is within the threshold distance, the mouse MCU may execute machine readable code instructions of the mouse authentication and input control agent to select between an AI assistant mode and a remote mouse communication mode, transfer of audio data stream for videoconference audio input and output back to the information handling system 200 from the wireless mouse 258 in a remote mouse communication mode following wireless mouse 258 placement on a surface, or initiate or relax additional user authentication operations via continuous movement or a timeout requirement for voice access capture and authentication in various embodiments relative to the threshold distance. It is appreciated that the threshold distance may be set to any distance, and the present specification contemplates various other distances. For purposes of discussion in FIG. 2, however, where the wireless mouse 258 is detected at or to at the first, closer distance "A" from the information handling system 200, the wireless mouse 258 is within the threshold distance, and where the wireless mouse 258 is detected further than the first distance "A" such as at the second distance "B," the distance between the information handling system 200 the wireless mouse 258 is beyond the threshold distance.

As described herein, the information handling system 200 is operatively coupled to a wireless mouse 258 via a wireless connection facilitated by the operation of a mouse wireless interface adapter 280, a mouse radio 282, a mouse RF front end 284, and a mouse antenna 286. As described herein, the wireless mouse 258 may be configured to provide cursor input to the information handling system 200 such that a user may select objects on a GUI presented on the digital display device 250 of the information handling system 200.

In addition to providing cursor input at the information handling system 200, the wireless mouse 258 may also include audio capabilities with a mouse microphone 260-2 and mouse speaker 262 that enable the capability of detecting the voice of the user when speaking. A voice access listening system described herein may include a mouse MCU 270 executing machine readable code instructions of a voice access capture module 292-2 and a mouse authentication and input control agent 272-2 to compare captured voice cadence, tonality, and other metrics and patterns of passive speech with previously captured speech samples of an identified and authorized user stored in an audio sample database 276. In an embodiment, this voice access listening system may prevent access to both the information handling system 200 and the wireless mouse 258 by voice access attempts. In the context of the present specification, the voice access listening system also allows for reauthentication of the user during the methods described herein in order to assure that the user is still in operative contact with the wireless mouse 258, for example, during a remote mouse communication mode at or beyond a threshold distance for a videoconferencing session conducted on the information handling system 200.

Again, It is appreciated that the voice access listening system of the wireless mouse 258 described herein may detect any type of voice of the user including under a variety of environmental backgrounds. In an embodiment, the mouse voice access capture module 292-2 may capture the passive voice of the user under a variety of conditions. The passive voice of a user may be any type of normal random speech that does not necessarily require the user to say a specific word and which may be monitored by the mouse voice access capture module 292-2 and the mouse microphone 260-2. Voice access inputs with this passive voice of the user may be used to both authenticate the user and, via an automatic speech recognition (ASR) machine learning (ML) algorithm 279, convert the spoken input into a textual representation of the detected speech. Once converted, a natural language processing (NLP) algorithm module 277 may analyze the recognized text to determine semantic meaning, identify speaker intent, and filter whether the content is related to an actionable command or simply background conversation.

Additionally, or alternatively, the voice access listening system may be configured to capture active voice input of the user. In this embodiment, the active voice comprises deliberate user speech that does require the utterance of a particular word or phrase such as a "wake word." Further, in some embodiments, the disclosed system allows the particular word or phrase to be private or secret to the user that amounts to a user-known name or spoken codeword, thereby providing an additional security layer unlike a commonly known wake words. When the active voice phrase, whether a "wake word" or a secret code word, is spoken by the user, the mouse voice capture access module 292-2 actives with the mouse microphone 260-2 to pick up the user's voice and the audio of the user's voice is passed onto the voice access listening system for authentication of the user for the assigned security level for the wireless mouse 258. Further, that or additional voice input may then access an NLP algorithm 277 to parse and treat the subsequent speech as a command sequence. Here, an ASR algorithm 279 may transcribe the voice input into text format for wake word matching. Further, the ASR algorithm 279 may transcribe the voice input for the NLP algorithm module 277 to interpret the user's voice input as chat bot input instructions or commands for the operatively coupled information handling system 200. These interpreted instructions may then be executed by the information handling system 200 in accordance with the user's assigned access rights and security level described herein. Thus, where the specification describes the use of the user's passive voice as input into a trained contextual environmental ML model 274, it is appreciated that the user's active voice may also be used in similar embodiments as described above and the present specification contemplates such use of an active voice system in place of a passive voice system.

In an embodiment, the information handling system 200 executes machine readable code instructions of the voice access capture module 292-1 and the wireless mouse 258 may also execute its own voice access capture module 292-2. Execution of the voice access capture modules 292-1, 292-2 by the respective hardware processors (e.g., hardware processors 202, 204, 206, 208, 210 or mouse MCU 270) may cause the hardware processors to evaluate both the context in which the information handling system 200 is operating as well as audio analysis of a voice picked up by the microphone 260-1 of the information handling system 200 or the mouse microphone 260-2 for cadence, tonality, or other voice features to identify or authenticate the user in comparison to voice audio samples in a voice access attempt used to gain access to the information handling system 200 or provide input to the information handling system 200. The contextual data for the environmental context in which the information handling system 200 is operating may be determined from a contextual environment ML module 273, for example, for determining the background acoustical environment of the information handling system 200 or location or wireless network access among other factors determining environment security. In an embodiment, the execution of the voice access capture modules 292-1, 292-2 may also be used to authenticate and authorize the user to provide input and engage with, or continue to engage with, the wireless mouse 258 and information handling system 200 as described herein. By using a contextual environment ML module 273 for example, the information handling system 200 may evaluate this environmental context in which the information handling system 200 is operating from sensors reporting to the hardware processors, evaluate the audio received at the microphones 260-1, 260-2, and provide a context matching score determination. A context matching score may be used with a voice background matching score from, for example, a trained mouse environmental contextual ML algorithm module 274, to determine whether the audio received at the mouse microphone 260-2 of a voice access attempt meets a threshold access authorization confidence score that is an authorized user's voice to access the information handling system 200 and provide output to the information handling system 200. Such a threshold access authorization confidence score may require a 90%, 95%, or 98% confidence that the voice access attempt is genuine in an example embodiment. Any threshold access authorization confidence score is contemplated for comparison against a combined voice background matching score and a context matching score. It is appreciated that an audio sample database 276 within the wireless mouse 258 and any other similar storage device in the information handling system 200 may be maintained with captured voice audio samples for a user for these comparisons purposes. The mouse MCU 270 or another hardware processor at the information handling system may execute machine readable code instructions of the mouse authentication and input control agent with a trained recursive neural network or other machine learning classifier in an embodiment. Inputs of the audio samples, an identified framework of data for a user's voice features such as cadence metrics, tonality metrics, pace of speech, or other features of a user's speech as compare and an input of a captured voice access speech attempt by mouse microphone 260-2 or microphone 295 may be input to the machine readable code instructions of the mouse authentication and input control agent with a trained recursive neural network or other machine learning classifier and a correlation score (e.g., 90%) may be output to determine if a threshold correlation score has been met to authenticate the voice access attempt by the user.

As described herein, the wireless mouse 258 may be used as an audio input and/or output device when the wireless mouse 258 is lifted from off of a surface such as a tabletop or mouse pad. In order to determine that the wireless mouse 258 has been lifted off from the surface, a plurality of sensors may be used such as the mouse IMU 264, an accelerometer, or the like. In an embodiment and in those examples of wireless mice 258 that include a light-emitting diode (LED) or laser optical technology and the like, the sensor may be the LED or laser optical technology that can detect when the surface if not flush or abutting the bottom surface of the wireless mouse 258. Alternatively, or additionally, the sensors may include a mouse inertial measurement unit (IMU) 264. The mouse IMU 264 may include an accelerometer and gyroscope that can determine the orientation and movement of the wireless mouse 258 as it is moved both over the surface and within three-dimensional (3D) space as the user lifts the wireless mouse 258 off of the surface. Additionally, or alternatively, the wireless mouse 258 may include a mouse touch sensor 266. The mouse touch sensor 266 may be used to determine if the user is physically holding the wireless mouse 258 such that, along with the output data from the mouse IMU 264, can verify that the user is in transit with the wireless mouse 258.

In an embodiment, the wireless mouse 258 may also include a mouse beacon module 278-2 executing with the mouse wireless interface adapter 280 having a mouse radio 282 mouse RF front end 284 and one or more antennas 286 in some embodiments. The mouse beacon module 278-2 may be operatively coupled to the mouse wireless interface adapter 280. In an embodiment, the mouse beacon module 278-2 may operate in connection with a counterpart wireless interface 278-1 to determine a distance of the wireless mouse 258 from the information handling system 200. The mouse beacon module 278-2 may have a counterpart mouse beacon module 278-1 operating with the wireless interface adapter on the information handling system 200. As such, in an embodiment, the mouse beacon module 278-2 may include an ultra-wideband (UWB) ranging beacon the transmits very short-duration pulses across a wide frequency spectrum (e.g., 3.1 to 10.6 GHz) to the counterpart mouse beacon module 278-1 or vice versa. The wireless mouse 258 and information handling system 200 may, in another example embodiment, exchange these pulses and use a time-of-flight (ToF) or round-trip time (RTT) to calculate the distance between them. Alternatively, the mouse beacon module(s) 278-1 or 278-2 may include a Bluetooth Low Energy® (BLE) RSSI-based beacon. In this example, the wireless mouse 258 may periodically transmit a BLE advertisement packet with the information handling system 200 estimating a proximity of the wireless mouse 258 to the information handling system 200 using a received signal strength indicator (RSSI).

As described herein, the user may execute machine readable code instructions of a videoconferencing application in order to initiate a videoconferencing call with other remote users. During this videoconferencing call, the user may want to get up and move around in order to engage in multitasking activities. These other activities may include retrieving items such as printed materials from a different room, getting a snack from a kitchen area, among other activities that may draw the user away from being present in front of the information handling system 200. The user may still want to verbally interact, at least, with the other participants on the videoconference session although she is not physically present in front of the digital display device 250 and camera 293 of the information handling system 200.

Previous to the user engaging with the wireless mouse 258 to provide input to the information handling system 200, the user may be authenticated via a user authentication module 290 of the information handling system 200. The machine readable code instructions of the user authentication module 290 may be executed along with a voice access capture module 292-1 and a user biometrics module by, for example, the hardware processor 202 in order to allow access to the information handling system 200 by the user. This may include the execution of the user biometrics module (e.g., 194 in FIG. 1) to receive and compare biometrics of the user (e.g., image of user's face, fingerprint, etc.) to store biometric data in a data storage device such as the static memory 214.

Similarly, in an embodiment, the hardware processor 202 may execute machine readable code instructions of a voice access capture module 292-1. Execution of the voice access capture module 292-1 may initiate the capture and comparison of a user's voice (passive or active voice) as described herein in order to identify the user from normal random speech of the user at the microphone 260-1 based on features of a user's speech for metrics including cadence, tonality, pace and other aspects measured from a verified user's audio samples. These verified user's audio samples may be verified, for example, with biometrics such as identification of a visual image of an identified user and movement of the user's mouth that tracks the recorded voice samples. As the user is authenticated via the user authentication module 290, this authentication may be passed to the wireless mouse 258 and maintained by the mouse MCU 270 on a mouse memory device 268 in embodiments when the wireless mouse 258 may be used in a remote mouse communication mode, for example. Again, the user engagement with the information handling system 200 in order to be authenticated may allow for continuing authentication to be maintained after the user has lifted the wireless mouse 258 off of the surface. This lifting of the wireless mouse 258 from off of the surface as well as maintaining continuous motion carries the authentication status of the user until such a time that the user places the wireless mouse 258 on a surface and continuous motion is no longer detected Thus, as the wireless mouse 258 is being used as a cursor movement input device while on the surface, this authentication data may be transferred to the wireless mouse 258 for updated authentication data that may be used later when the wireless mouse 258 may operate in a remote mouse communication mode. Still further, one or more audio samples of the user's voice in different contexts may be maintained on the static memory 214 during the comparison of currently captured voice to the audio samples previously captured and verified. Comparison may be made via input of recorded audio samples of a user's voice, metrics or features associated with the identified user's voice, biometrics if available, and a voice access input into executing machine readable code instructions of a recursive neural network or other AI or machine learning comparator for a mouse authentication and input control module 272-1 on the information handling system 200 or a mouse authentication and input control agent 272-2 on the wireless mouse 258 to output a correlation confidence score that the voice captured is the identified user's in embodiments herein. The audio samples may be captured in various contexts such as the user in quiet and noisy environments such that any currently captured voice may be compared to those audio samples via a contextual environment ML module on the information handling system 200 or by a trained mouse environmental contextual ML algorithm module 274 on the mouse during later steps in the method described herein as added inputs into the trained recursive neural network or other AI or machine learning comparator for a mouse authentication and input control module 272-1 on the information handling system 200 or a mouse authentication and input control agent 272-2 on the wireless mouse 258.

In an embodiment, as the user lifts the wireless mouse 258 from off of the surface, the mouse IMU 264 may detect this removal and cause the wireless mouse 258 to operate as an audio input and output device instead of or in addition to a cursor control input device. As this occurs, the mouse MCU 270 may execute machine readable code instructions of the mouse authentication and input control agent 272-2 cause a signal to be sent, wirelessly, to the information handling system 200 for the information handling system 200 execute the mouse authentication and input control module 272-1 thereon to pause operation of the microphone 260-1 and the speaker 297 so that the wireless mouse 258 may be used for these purposes in one embodiment. At this point, the hardware processor executed machine readable code instructions of the mouse authentication and input control module 272-1 to route audio data from the videoconference session to the mouse microphone 260-2 and mouse speaker 262 of the wireless mouse 258 via a wireless audio data stream using the wireless interface adapter and the mouse wireless interface adapter 280 for operating in a remote mouse communication mode embodiment. In an embodiment, the authentication data associated with the authentication of the user at the information handling system 200 may be transferred to the wireless mouse 258 along with any updated audio samples that may be used to reauthorize the user at the wireless mouse 258 where necessary. In this state for the remote mouse communication mode triggered by lifting the wireless mouse 258, the user may walk away from the information handling system 200 and engage in those multitasking activities described herein while listening to or even speaking into the mouse for videoconference communications.

At this time, the mouse IMU 264 and other sensors may be used to determine whether the wireless mouse 258 is in continuous motion while in a remote mouse communication mode. In an embodiment, continuous motion may include slight movement of the wireless mouse 258 within 3D space and may be sporadic movement that indicates that the user is walking or otherwise moving with the wireless mouse 258 in the user's hand. Where the mouse MCU 270, receiving input from the mouse IMU 264, has determined that the wireless mouse 258 is in continuous motion, the previous authentication of the user via voice access authentication is maintained a the wireless mouse 258 due to the transfer of authentication data from the information handling system 200 to the wireless mouse 258 upon detection of the wireless mouse 258 being removed from the surface by the user and triggering a remote mouse communication mode.

It is appreciated that, during this method, the mouse MCU 270 may use the mouse beacon module 278 to determine if the wireless mouse 258 is within a threshold distance (e.g., at the first distance "A" or closer) from the information handling system 200 versus beyond a threshold distance (e.g., at second distance "B") for additional seamless transitions of the wireless mouse 258 between different states or modes. In an embodiment, this threshold distance may be set such that if the wireless mouse 258 is brought back to within the threshold distance during remote mouse communication mode and the wireless mouse 258 has been put down on the surface, executing of machine readable code instructions of the mouse authentication and input control agent 272-2 reroutes the audio data stream to transfer videoconference audio input and output back to the information handling system 200 to allow the user to both hear the videoconferencing session and be heard during the videoconference session (e.g., within 5 feet) at the information handling system. It is appreciated that the threshold distance may be set to any distance, and the present specification contemplates these other distances. In various other embodiments, detection of mouse 258 distance relative to this threshold distance may be used by the mouse authentication and input control agent 272-2 to transition between an AI assistant mode, a remote mouse communication mode, operations of the videoconference back at the information handling system 200, or determination when addition security measures and authorization monitoring may be needed at the wireless mouse 258 or the information handling system 200.

It is appreciated that when the user is engaged in these multi-tasking activities while in a remote mouse communication mode, the user may wish to, at least temporarily, place the wireless mouse 258 down. Again, the mouse IMU 264 and other sensors may detect the placement of the wireless mouse 258 on the surface. This creates a situation where the mouse MCU 270 executes machine readable code instructions of the mouse authentication and input control agent 272-2 to determine that not only is the wireless mouse 258 not in continuous motion, but the wireless mouse 258 has been set onto a surface during remote mouse communication mode. The mouse MCU 270 may execute the mouse beacon module 278-2 or its counterpart 278-1 at the information handling system, at this time, to also determine if the user and wireless mouse 258 are near the information handling system 200 (e.g., if the wireless mouse 258 is within or outside of the threshold distance). Where, for example, the user/wireless mouse 258 is within the threshold distance, the mouse MCU 270 may signal to the information handling system 200 to execute machine readable code instructions of the mouse authentication and input control module 272-1 there reroute audio input and output back to the microphone 260-1 and speaker 297, respectively, of the information handling system 200. Accordingly, then, the hardware processor of the information handling system 200 may also execute the user authentication module 290 locally to authorize the user transitioning the current authorization state back from the wireless mouse 258. In an embodiment, previous authentication data once transferred to the wireless mouse 258 may be transferred back to the information handling system 200 to maintain the user's authentication. In some embodiments, re-execution of the user biometric module 294 and voice access capture module 292-1 may be done so as to reauthenticate the user so that the digital display device 250 once locked when the wireless mouse 258 was lifted off of the surface and remote mouse communication mode was triggered, can be unlocked for the user to view the videoconference session in progress.

It is appreciated that the user may place the wireless mouse 258 on a surface with the wireless mouse 258 being detected at a distance, such as distance "B," outside the threshold distance from the information handling system 200. At this point, in order to maintain security at the information handling system 200 and for the videoconference session as well as with the wireless mouse 258, execution of the machine readable code instructions of the mouse authentication and input control agent 272-2 may revoke the authentication of the user with the audio output and input at the wireless mouse 258 being stopped. In an example embodiment, the revoked authentication of the user at the wireless mouse 258 may be revoked if the mouse 258 is detected as being placed on a surface and does not move after a predetermined period of time. However, if the wireless mouse 258 is near the information handling system 200, the information handling system 200 may reauthenticate the user. In an embodiment, a timeout timer may be started via execution of the machine readable code instructions of the mouse authentication and input control agent 272-2 when the wireless mouse 258 is set down on a surface beyond the threshold distance such that the user must, through voice detection by the voice access capture module 292-2 and mouse microphone 260-2, be authenticated. As described herein, the mouse MCU 270 may execute machine readable code instructions of the mouse authentication and input control agent 272-2 in order to receive voice access input from the user's voice detected on mouse microphone 260-2 and, via a trained mouse environmental contextual ML algorithm module 274 and the voice access capture module 292-2, compare the currently-obtained voice access input to one or more audio samples within the audio sample database 276 in order to reauthorize the user for a period of time. Where no voice access input can be obtained or authenticated, the videoconference session wireless audio data stream may be terminated in the remote mouse communication mode in order to prevent unauthorized users from listening to or engaging in the videoconference session. However, where the voice access input is received and authentication of the user can be achieved via execution of the machine readable code instructions of the mouse authentication and input control agent 272-2, the videoconference session may be continued although the wireless mouse 258 has been set on a surface and is outside of the threshold distance from the information handling system 200.

As described in another embodiment herein, the initial lifting of the wireless mouse 258 from off of the surface may cause a different action to be initiated that may include an AI agent mode of operation. In an embodiment, as the user lifts the wireless mouse 258 off of the surface, the mouse MCU 270 executing the machine readable code instructions of the mouse authentication and input control agent 272-2 may signal to the information handling system 200 and the mouse authentication and input control module 272-1 thereon that machine readable code instructions of an AI assistant module 288-1 are to be executed so that the user may engage with an AI assistant. At this point, audio input at the microphone 260-1 of the information handling system 200 is muted and the hardware processor may execute machine readable code instructions of the mouse authentication and input control module 272-1 to establish a secondary audio data stream wirelessly with the wireless mouse 258 to receive audio input at the mouse microphone 260-2. This allows a user to provide audio input via the wireless mouse 258 to the AI assistant while the video conference audio data stream may still be ongoing at the speaker 297, but so that those other attendees of the videoconference session cannot hear the user interacting with AI assistant module executing to provide a chatbot or GUI interface for the AI assistant.

In an embodiment, the user may interact with the AI assistant via voice input via mouse microphone 260-2 for a chatbot interface as well as via selection movements of the wireless mouse 258 within 3D space for cursor movement on the AI assistant GUI. In an embodiment, the mouse IMU 264 may be used to provide output to the information handling system 200 indicative of which of the AI assistant results displayed on the AI assistant GUI on the digital display device 250 is to be selected. In an embodiment, the mouse microphone 260-2 may continuously receive audio input from the user in order to engage, verbally, with the AI assistant executed via machine readable code instructions of the AI assistant module 288-1 in order to respond to user queries, for example, to gain more information related to the videoconference session topics. Instead of the user interfering with the flow of the discussion during the videoconference session or manually muting the discussion and finding and opening an AI assistant, the user may lift the wireless mouse 258 as detected by the mouse IMU 264 such that execution of machine readable code instructions of the mouse authentication and input control agent 272-2 signals an automatic trigger to engage with the AI assistant module 288-1 in order to ask these questions. In one example embodiment, if the user moves away with the wireless mouse 258 beyond a threshold distance, such as distance "B," from the information handling system 200, the machine readable code instructions of the mouse authentication and input control agent 272-2 may trigger a seamless switch to the remote mouse communication mode such that the secondary wireless audio data stream is terminated and the audio data stream for the video conferencing session is automatically rerouted for a wireless audio data stream to the remotely located wireless mouse 258. This enables a seamless switching by the execution of machine readable code instructions of the mouse authentication and input control agent 272-2 and its counterpart mouse authentication and input control module 272-1 on the information handling system 200 between the AI assistant mode and a remote mouse communication mode in one example embodiment. In other embodiments, the AI assistant mode or the remote mouse communication mode may operate independently and without the other available.

When the user places the wireless mouse 258 back on the surface and the wireless mouse 258 is determined to be within the threshold distance from the information handling system 200 in some embodiments, the mouse MCU 270 may execute machine readable code instructions of the mouse authentication and input control agent 272-2 to trigger rerouting the audio data stream for audio input from the mouse microphone 260-2 and back to the microphone 260-1 of the information handling system 200. Thus, a user may move away from the information handling system 200 beyond a threshold distance and continue with the ongoing videoconference in a remote mouse communication mode and then return to the information handling system 200 to reengage with the videoconference session without interrupting the videoconference. In another embodiment, a user may verbally engage with the AI assistant of the information handling system 200 during the videoconference, and when the mouse is returned to a surface detected within the threshold distance, execution of the machine readable code instructions of the mouse authentication and input control agent 272-2 and the counterpart machine readable code instructions of the mouse authentication and input control module 272-2 at the information handling system will reengage with the videoconference session on the information handling system 200 when the requested information has been obtained by the user via the AI assistant. For example, the microphone 295 may be unmuted, the speaker 297 returned to a previous volume, and the secondary audio data stream with the wireless mouse 258 for utilization of the AI assistant may be terminated in embodiments herein.

In another embodiment, the user may selectively switch between a first state where the wireless mouse 258 operates in the remote mouse communication mode to wirelessly reroute the audio data stream to provide videoconference audio input and output allowing the user to walk away from the information handling system 200 and a second state where a secondary audio data stream routed through the wireless mouse 258 for interaction with the AI assistant via execution of the AI assistant module 288-1. Execution machine readable code instructions of the mouse authentication and input control module 272-1 by a hardware processor (e.g., 102 in FIG. 1) of the information handling system 200 and execution of the execute machine readable code instructions of the mouse authentication and input control agent 272-2 by the mouse MCU 270 may coordinate this switching between states and operating modes.

This switching or toggling between a first state for the remote mouse communication mode and a second state for the AI assistant mode may be completed by the user by performing certain actions such as pressing a hotkey button on the keyboard 252 or the wireless mouse 258, selecting an option presented on a GUI presented on the digital display device 250, or performing a gesture. In an embodiment, the toggling gesture may include a rapid shaking of the wireless mouse 258 as detected by the mouse IMU 264. In this embodiment, the user may lift the wireless mouse 258 off of the surface as detected by the mouse MCU and the execution of the machine readable code instructions of the mouse authentication and input control agent 272-2 will automatically signal for initiation of one of the first state or second state with the information handling system 200. The user may then shake the wireless mouse 258. The mouse IMU 264 may detect this shaking which may be defined by a duration sufficient for the mouse IMU 264 to signal to the mouse MCU 270 executing machine readable code instructions of the mouse authentication and input control agent 272-2 that a toggle or transition gesture has been made at the wireless mouse 258. Then, the machine readable code instructions of the mouse authentication and input control agent 272-2 may execute to signal the machine readable code instructions of the mouse authentication and input control module 272-1 executing at the information handling system to either reroute video conferencing audio data stream to the wireless mouse 258 or initiate a secondary audio data stream with the wireless mouse 258 for use with the AI assistant module 288-1 depending on which state is being toggled to. It is appreciated that the user may perform this transition gesture at any time and any number of times after the wireless mouse 258 has been lifted from the surface to toggle between a remote mouse communication mode or an AI assistant mode in embodiments herein.

The present systems and methods, therefore, allow for a user to multi-task during a videoconferencing session without interrupting others who may also be participating. Indeed, by lifting the wireless mouse 258, the user may still provide audio input via the mouse microphone 260-2 and mouse speaker 262 of the wireless mouse 258 as the user walks away from the information handling system 200. Still further, without bothering other users on the videoconferencing call, the user may further investigate and get more details on the subject matter being presented during that videoconference session. This allows the user to engage in further studying while the conversation is allowed to continue without the user bothering others in the videoconference. This may also allow the user to engage in a deeper discussion during the videoconference session such that more can be accomplished than would otherwise have been possible without the wireless mouse 258 and AI assistant interaction.

Figure 3:
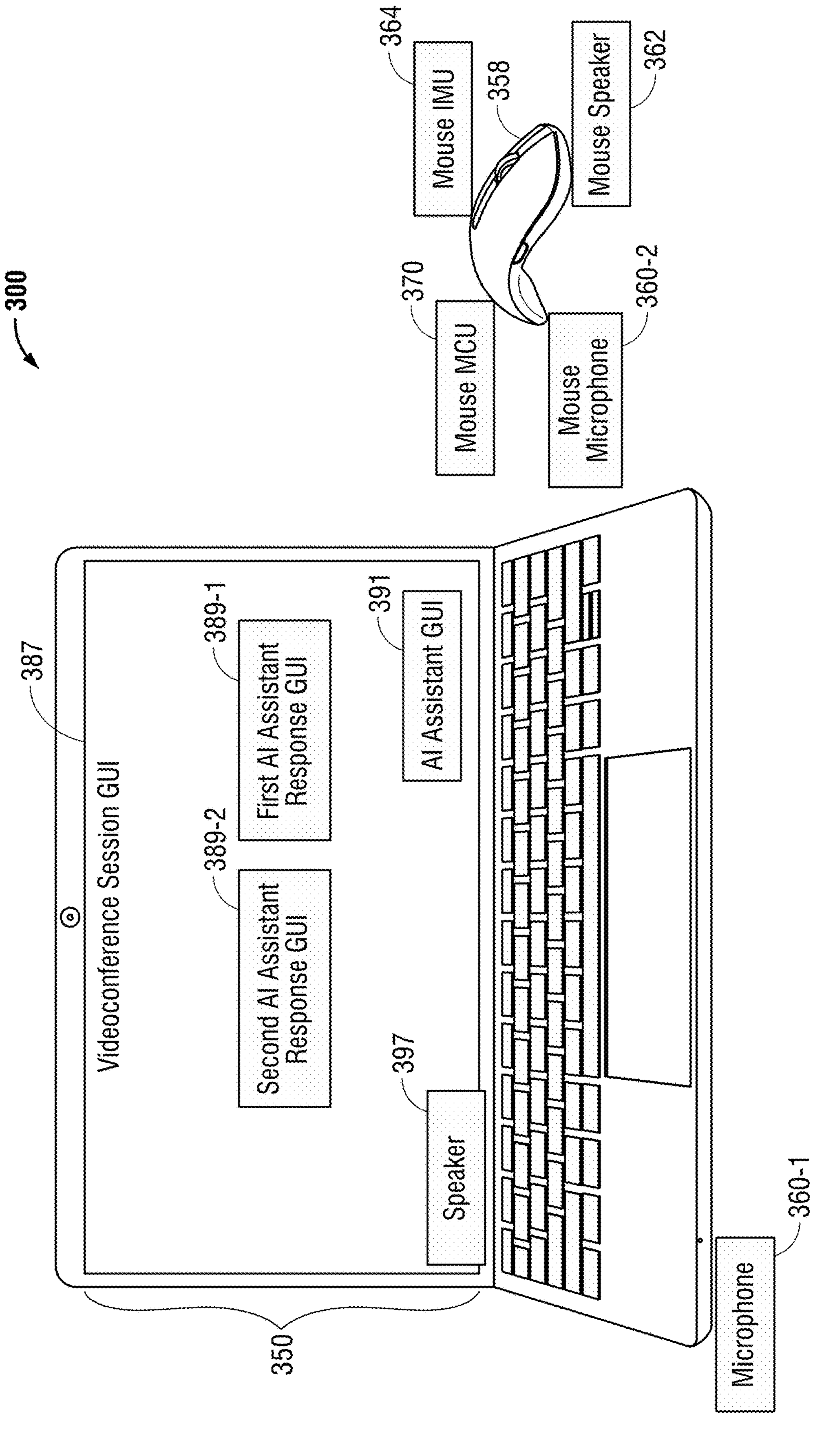
FIG. 3 is a graphic diagram of an information handling system and a wireless mouse with audio capabilities and the wireless mouse being used to interact with an AI assistant graphical user interface presented on a digital display device of the information handling system upon initiation during a videoconference call according to an embodiment of the present disclosure.

FIG. 3 is a graphic diagram of an information handling system 300 and a wireless mouse 358 with the wireless mouse 358 being used to interact with an AI assistant graphical user interface (GUI) 391 presented on a digital display device 350 of the information handling system 300 according to an embodiment of the present disclosure. It is appreciated that the information handling system 300 shown in FIG. 3 may be similar to other information handling systems described herein that allow a user to interface with an AI assistant presented on the AI assistant GUI 391 after a hardware processor of the information handling system 300 has executed machine readable code instructions of the mouse authentication and input control module (e.g., 172-1, FIG. 1) to trigger executing machine readable code instructions of the AI assistant module (e.g., 188-1, FIG. 1) when the mouse MCU 370 detects that the wireless mouse 358 has been lifted, such as during execution of a videoconference application for a videoconference session.

As described herein, the lifting of the wireless mouse 358 from off of a surface may be detected by a mouse IMU 364 and cause, in an embodiment, the wireless mouse MCU 370 executing machine readable code instructions of the mouse authentication and input control agent to trigger execution of the AI assistant module for initiation of AI assistant interaction by the user using the wireless mouse 358 as described herein. In an embodiment, as the user lifts the wireless mouse 358 off of the surface (e.g., a desktop), the mouse MCU 370 detects the lifting motion and executes machine readable code instructions of the mouse authentication and input control agent to signal to the information handling system 300 that machine readable code instructions of an AI assistant module is to be executed so that the user may engage with an AI assistant at the AI assistant GUI 391 during a videoconference session. At this point, the hardware processor executes machine readable code instructions of the mouse authentication and input control module to mute audio input at the microphone 395 of the information handling system 300 during the videoconference session. In another embodiment, the hardware processor executing machine readable code instructions of the mouse authentication and input control module may also reduce volume for or mute the speaker 397 at the information handling system 300 to allow better interaction with the AI assistant module. Concurrently, the hardware processor executes machine readable code instructions of the mouse authentication and input control module on the information handling system to establish a secondary audio data stream wirelessly with the wireless mouse 358 for audio input from the mouse microphone 360-2 or output at the mouse speaker 362 to be initiated for user audio input to the AI assistant module interactions and voice access authentication in various embodiments. This allows a user to provide audio input via the wireless mouse 358 to the AI assistant during the videoconference via a secondary wireless audio data stream so that those other attendees of the videoconference session cannot hear the user interacting with the AI assistant module.

In an embodiment, the user may interact with the AI assistant via voice input as well as via selection movements of the wireless mouse 358 within 3D space. In an embodiment, the mouse IMU 364 may be used to provide output to the information handling system 300 indicative of which of the AI assistant results displayed on a GUI on the digital display device 350 is to be selected. As shown in FIG. 3, the AI assistant GUI 391 may, based on the user vocal input at the mouse microphone 360-2, present one or more AI assistant response GUIs 389-1, or 389-2 while another window continues the videoconference session GUI 387. For example, a first AI assistant response GUI 389-1 may provide relevant information related to the subject matter being presented to the user during the videoconference session and a second AI assistant response GUI 360-2 may include relevant information related to any additional questions the user may have or may include ancillary information with citations the user may access through queries input via mouse microphone 360-2 or via selection of a link via 3D gesturing with the wireless mouse 358 using the AI assistant module during an AI assistant mode.

The AI assistant response GUIs 389-1, 389-2 may be overlayed over the videoconference session GUI 387 that is being presented to the user on the digital display device 350 while the videoconference session is ongoing and played over the speaker 397 of the information handling system 300 in the background. The user may also select with the 3D gesturing of the wireless mouse 358 to manually unmute a microphone 395 at the information handling system 300. In other embodiments, the user may end the AI assistant mode when the wireless mouse 358 is detected as being placed down again on the surface near, or within a threshold distance of, information handling system 300 and this may unmute the microphone 395 while ending the secondary audio data stream with the wireless mouse 358. In some embodiments however, AI assistant response GUIs 389-1 or 389-2 may remain after AI assistant mode has ended for reference by the user.

In an embodiment, the mouse microphone 360-2 may continuously receive audio input from the user while in a lifted state and detected as moving during AI assistant mode, in order to engage, verbally, with the executed AI assistant in order to gain more information. In an example embodiment, the user may request more information related to what is being discussed or shown on the videoconference session. Instead of the user interfering with the flow of the discussion during the videoconference session, the user may lift the wireless mouse 358 while near the information handling system 300 and trigger AI assistant mode to engage with the AI assistant module in order to ask these questions via establishing a secondary wireless audio data stream to the wireless mouse 358. In an embodiment, execution of machine readable code instructions of the mouse authentication and input control module by a hardware processor on the information handling system 300 may communicate the voice access input authorization to the mouse MCU 370 for ongoing authorization of the user on the secondary audio data stream at the wireless mouse 358 operating in AI assistant mode with the AI assistant module on the information handling system 300.

When the user places the wireless mouse 358 back on the surface and near, or within a threshold distance from the information handling system 300, the secondary audio data stream may be ended with the mouse microphone 360-2 and the videoconference data stream unmuted on microphone 395 of the information handling system 300. Thus, without interrupting the videoconference session a user may seamlessly switch to an AI assistant mode to verbally engage with the AI assistant of the information handling system 300 and reengage with the videoconference session when the requested information has been obtained by the user via the wireless mouse 358. This may be done in embodiments herein by executing machine readable code instructions of the mouse authentication and input control agent at the wireless mouse 358 and corresponding machine readable code instructions of the mouse authentication and input control module at the information handling system 300 to detect lifting of the wireless mouse 358 and trigger the AI assistant module.

Figure 4:
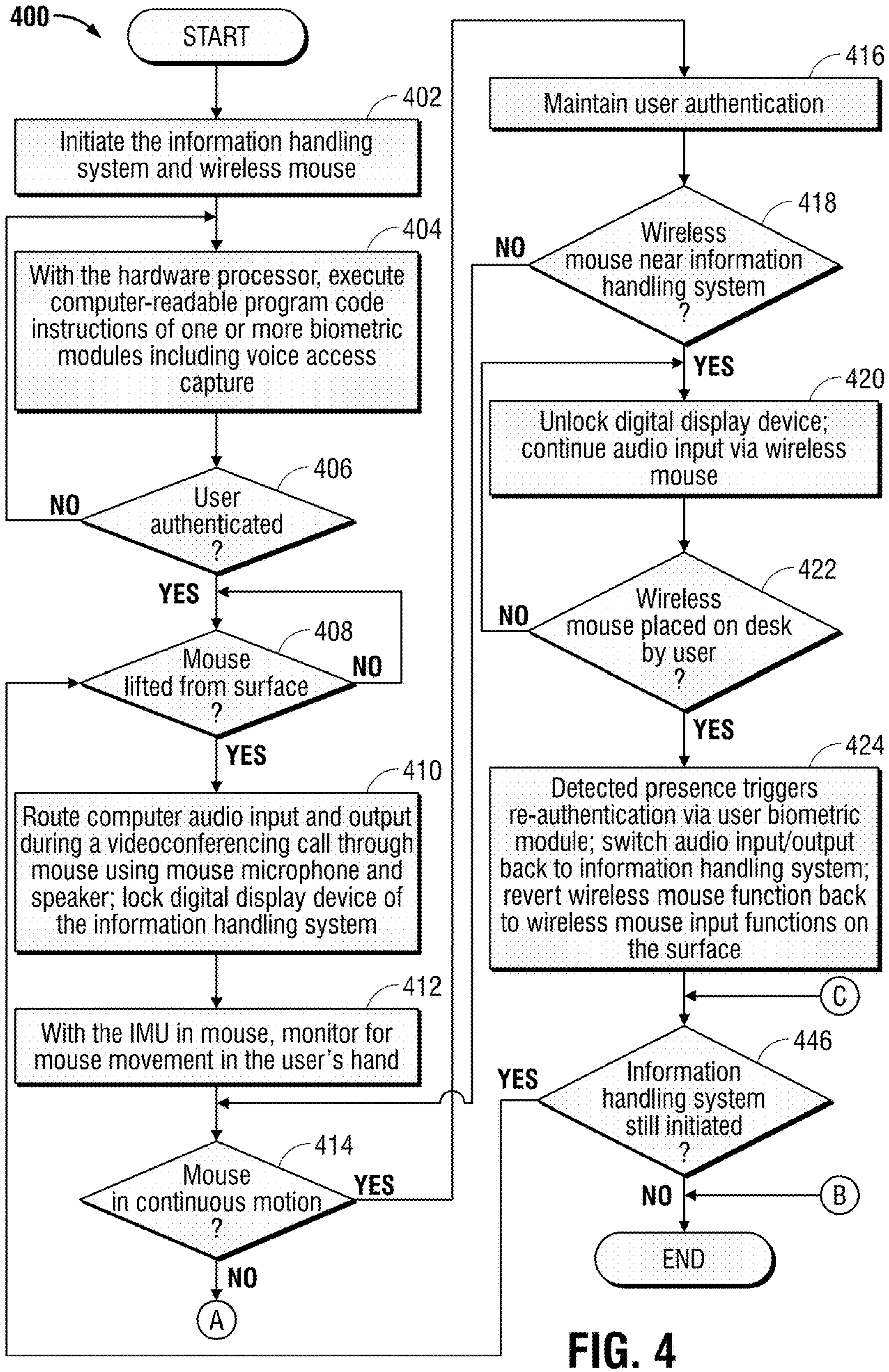
FIG. 4 is a flow diagram showing a hardware processor executing machine readable code instructions of a mouse authentication and input control module on an information handling system with a mouse having audio capabilities for a method of routing audio to the wireless mouse during a videoconference call at an information handling system according to an embodiment of the present disclosure.
Figure 4:
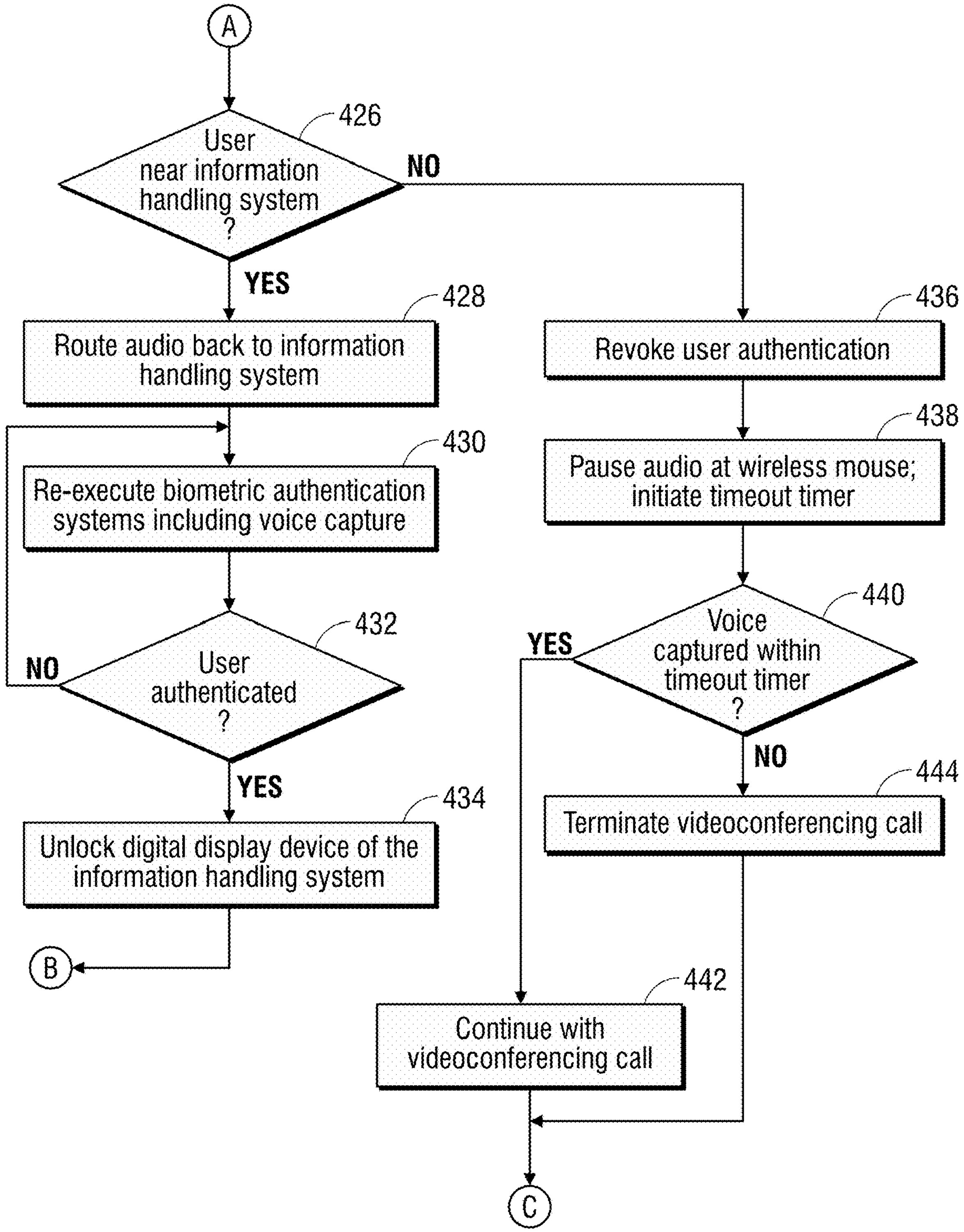

FIG. 4 is a flow diagram showing a method 400 of executing machine readable code instructions of the mouse authentication and input control module by a hardware processor routing an audio data stream to a wireless mouse during a videoconference call at an information handling system according to an embodiment of the present disclosure. The method of FIG. 4 may be performed by a user using any of the information handling systems and wireless mice described in connection with FIGS. 1 through 3.

At block 402, the method 400 may include initiating the information handling system and wireless mouse. In an embodiment, each of these devices may be initiated by the user pressing a button or toggling a switch. This directs power from the PMU of the information handling system to its hardware processors and other hardware components and directing power from the PMU to the mouse MCU and other hardware components such as those described and illustrated in FIGS. 1 and 2 above.

At block 404, the hardware processor of the information handling system may execute machine readable code instructions of the user biometric module and the voice access capture module. Both of these may form part of the user authentication module that verifies that the user accessing the information handling system is an authorized user for security of the information handling system. Again, execution of the voice access capture module may capture the voice of the user in order to verify, via the user's voice and metrics of the user's voice such as cadence, tonality, pace, and other voice characteristic metrics, that the user is an identified user authorized to access the information handling system. In order to accomplish this, in an example embodiment, the information handling system may execute machine readable code instructions of a contextual environmental ML module with the hardware processor to receive the user's voice access input via recording on a microphone. With the user authentication module and the contextual environmental ML module, the hardware processor may execute machine readable code instructions of a machine learning algorithm, such as a trained neural network algorithm, to compare that voice access input to recorded audio samples of the user's voice previously captured and including the one or more voice characteristic metrics in various contexts such as in a noisy environment, a quite environment, a specific location (identified via geolocation tagging for example), among other potential audio samples of the user's voice access for outputting a confidence score of identifying the user from the voice access inputs and adding an additional layer of security. The output of a comparison confidence value above a threshold level of confidence will lead to the user gaining access to operations of the information handling system if the user is an authorized user. It is appreciated that, in some embodiments, authorization data related to this particular authorization of the user from a voice access input may be stored, at least temporarily, in a data storage device for later transfer to the wireless mouse during the method 400 described herein.

The method 400 also includes, at block 406, determining if the user was authenticated to use the information handling system by execution of machine readable code instructions of the user authentication module and the contextual environmental ML module. Where the user is not authenticated, the method 400 returns back to block 404 for subsequent authentication processes to be conducted until an authorized user's voice is detected and compared to those audio samples leading to authorization of a user. Where the user has been authenticated by voice access inputs via execution of machine readable code instructions of the user authentication module and the contextual environmental ML module, the method 400 may continue to block 408.

At block 408, the mouse MCU may execute machine readable code instructions of a mouse authentication and input control agent to monitor for and determine if output from the mouse IMU has detected that the wireless mouse has been lifted off of a surface it was placed on. The mouse IMU may include an accelerometer and gyroscope that can determine the orientation and movement of the wireless mouse as it is moved both over the surface, lifted from a surface, and within 3D space after the user lifts the wireless mouse off of the surface. Where no such output from the mouse IMU detecting the wireless mouse being lifted is received, the method 400 continues to monitor for the event of the user lifting the wireless mouse from off of the surface. However, where the mouse IMU detects the lifting of the wireless mouse from off of the surface, the mouse MCU executes machine readable code instructions of the user authentication agent to initiate, via a signal to the host information handling system, those processes described herein that, at least, allow a user to continue with a videoconference session away from the information handling system with a remote mouse communication mode allowing the user to use a mouse speaker and mouse microphone to engage in multi-tasking activities away from the information handling system. In some embodiments herein, block 508 also requires execution of complementary mouse beacon modules at the wireless mouse and information handling system to detect, such as through UWB ranging, that the mouse is beyond a threshold distance from the host information handling system before initiating the remote mouse communication mode. On one optional example of this latter embodiment, an AI assistant mode as described further herein such as in FIG. 5 below, may be initially started until a threshold distance is met or exceeded from the host information handling system such that seamless transition between an AI assistant mode and a remote mouse communication mode is available.

At block 410 and after the user has lifted the wireless mouse off of the surface, the method 400 includes the hardware processor of the information handling system executing machine readable code instructions of the mouse authentication and input control module to commence a remote mouse communication mode in some embodiments to reroute videoconference audio input and output in a wireless audio data stream during the videoconferencing call through wireless mouse. In such an embodiment, the mouse authentication and input control agent executing on the mouse MCU causes the videoconference audio input and output to be active using mouse microphone and mouse speaker during the remote mouse communication mode. Additionally, the machine readable code instructions of the mouse authentication and input control module may lock down digital display device at the information handling system so that others cannot view the proceedings that are occurring on the videoconference session while a user has stepped away with the wireless mouse in remote mouse communication mode. In an embodiment, as the mouse MCU has detected from the output of the mouse IMU that the mouse has been lifted, the mouse MCU may signal to the hardware processor of the information handling system to execute the mouse authentication and input control module such that the audio is rerouted through the wireless adapter of the information handling system to the wireless mouse instead of to the local microphone and speaker. Thus, the hardware processor of the information handling system may mute its microphone and speaker and begin to wirelessly transmit the audio data stream rerouted between the information handling system and the wireless mouse. Additionally, the mouse MCU may cause the wireless mouse microphone and mouse speaker to be initiated so that the user may both listen to and speak during the videoconference session through the wireless mouse operating in a remote mouse communication mode. In an embodiment, the user authentication established via voice access authentication, biometrics, some combination or other authentication may be transferred to memory and stored on the wireless mouse by the mouse MCU as the wireless mouse commences operations in the remote mouse communication mode.

At this point, the user is free to move away from the information handling system while the videoconference session is being conducted while also, via the wireless mouse, engaging in the videoconference session. At block 412, the mouse IMU may monitor for movement of the wireless mouse that is being held in the user's hand and operating in the remote mouse communication mode. In one embodiment, a mouse touch sensor may be used by the mouse IMU to detect that the user is holding the wireless mouse or the mouse IMU may be used to detect movement, however slight, of the wireless mouse. In an embodiment, sporadic movement of the wireless mouse may be detected using a movement timer that is set to a predetermined threshold time limit (e.g., 5 seconds) in order to determine if the wireless mouse is in continuous periodic motion. At block 414, the mouse MCU executes machine readable code instructions of the mouse authentication and input control agent to determine from the mouse IMU, touch sensor, or other sensors if the wireless mouse is in continuous motion or continuous periodic motion. If the mouse MCU executing the mouse authentication and input control agent determines that the wireless mouse is in continuous or continuous periodic motion and in ongoing possession or use by a user, the flow proceeds to block 416. If the mouse MCU executing the mouse authentication and input control agent determines that the wireless mouse has not been in continuous or continuous periodic motion after a period of time expires, the flow proceeds to block 426 to assess security of the wireless mouse and the information handling system.

At block 416, the user's authentication, that was established at the host information handling system via voice access authentication and transferred to the wireless mouse during initiation of the remote mouse communication mode, is maintained at the wireless mouse with no need for the user to be reauthenticated at block 416. The method for execution of machine readable code instructions of the mouse authentication and input control module or agent determines proceeds to block 418.

It is appreciated that the mouse MCU may execute, concurrently, a mouse beacon module with a mouse wireless adapter at block 418 to determine if the user is near the information handling system and within the threshold distance to the host information handling system as described in embodiments herein. Alternatively or additionally, the hardware processor for the information handling system may execute a counterpart mouse beacon module with its wireless adapter to assist with or separately determine the distance between the wireless mouse and the host information handling system. Where the wireless mouse is not near the information handling system and beyond the threshold distance at block 418, the method 400 returns back to block 414 for a continuous determination that the wireless mouse is in continuous motion or continuous periodic motion for ongoing security monitoring that the mouse has not been left behind. The mouse beacon module or modules may operate via UWB ranging, RSSI distance determination, infrared or ultrasound distance determination or a plurality of other types of distance determinations according to various embodiments herein.

Where, however, the mouse MCU determines via the execution of the copter-readable program code instructions of either or both counterpart mouse beacon module that the wireless mouse is near and within the threshold distance of the information handling system at block 418, the method 400 continues to block 420. Movement of the wireless mouse within the threshold distance is indicative of the user returning back to the information handling system after engaging in those multi-tasking activities using the remote mouse communication mode. At bock 420, the method 400 includes ending the remote mouse communication mode such as by unlocking the digital display device of the information handling system so that the user may visually see what is occurring on the videoconference session. For example, the mouse MCU executes machine readable code instructions of the mouse authentication and input control agent to wirelessly signal to the information handling system that the wireless mouse has returned to within a threshold distance. Additionally, in one embodiment at block 420, the method 400 includes continuing audio input and output via the wireless mouse on the rerouted audio data stream even though the wireless mouse has returned to within the threshold distance. In this embodiment, audio input and output at the wireless mouse does not terminate and is not rerouted back to the speaker and microphone at the information handling system until the wireless mouse is detected as being placed back onto the surface and is within the threshold distance of the host information handling system. In another alternative embodiment, the audio input and output at the wireless mouse does terminate and is rerouted back to the speaker and microphone at the information handling system when the wireless mouse is detected as coming within the threshold distance of the host information handling system.

Returning to the embodiment where the videoconference audio data stream has not yet been rerouted to the information handling system but the wireless mouse is detected within the threshold distance, at block 422, the mouse MCU of the wireless mouse, using the mouse IMU or other sensor (e.g., a mouse LED optical tracking sensor), may determine if and when the wireless mouse has been placed on the surface. Where the wireless mouse is not placed on the surface, the method 400 returns back to block 420 to monitor for if and when the mouse is placed on the surface near the information handling system in this embodiment. Where, however, the user does place the wireless mouse back on the surface, such as on a mouse pad, within a threshold distance from the host information handling system, the method continues to block 424.

At block 424, the method 400 includes the hardware processor initiating the authentication process described in connection with block 404, for example, with the user presence triggering this reauthentication process via the user biometric module and voice access capture module of the user authentication module. Further, upon the mouse being detected as within the threshold distance of the information handling system again and, in some embodiments, detected as being placed on a surface nearby, the hardware processor executes machine readable code instructions of the mouse authentication and input control module such that the videoconference audio input and output may be transferred back to the information handling system with the microphone and speaker of the information handling system being unmuted and active again. Additionally, because the wireless mouse is now detected as being placed on the surface, the functionalities of the wireless mouse return for use in cursor control functions as described herein.

The flow then proceeds to block 446 for a determination as to whether the information handling system is still initiated. Where the information handling system is no longer initiated, the method 400 may end here. Where the information handling system is still initiated, the method 400 continues to block 408 to determine if the wireless mouse is again lifted off of the surface and the method may proceed again as described.

Returning to block 414, it is appreciated that the mouse MCU may have determined that the wireless mouse is no longer in continuous motion or continuous periodic motion after having been lifted from a surface and the remote mouse communication mode is initiated. This may be due to the user placing the wireless mouse on a surface that is distant from the information handling system. Thus, where the mouse MCU has determined that the mouse is no longer in continuous motion in remote mouse communication mode, the mouse MCU executes machine readable code instructions of the mouse authentication and input control agent to then determine, at block 426, if the wireless mouse is within or beyond the threshold distance from the information handling system. The mouse MCU executes machine readable code instructions of the mouse authentication and input control agent to execute the mouse beacon module or modules at the wireless mouse or information handling system to determine an output of the wireless mouse location distance from the information handling system.

Where, at block 426, the mouse MCU has determined that the wireless mouse is near the information handling system, or within a threshold distance of any number of feet (e.g., 3 ft, 5 ft, or another threshold distance) the method 400 continues to block 428. At block 428, if the wireless mouse is within the threshold distance, the hardware processor at the information handling system executes machine readable code instructions of the mouse authentication and input control module to transfer the audio data stream for the videoconference audio being routed back to the information handling system speaker and microphone. As with block 420, the digital display screen may be unlocked first and then the audio data stream rerouted back to the speaker and microphone on the information handling system in some embodiments at block 428. The method then proceeds to block 430 with the hardware processor initiating the authentication process described in connection with block 404, for example, with the user presence triggering this reauthentication process via the user biometric module and the voice access capture module of the user authentication module at the information handling system. These processes described in blocks 428 and 430 may be similar to those described in connection with blocks 420 and 424 allowing the user to be reauthenticated prior to the digital display device being unlocked.

Where the user is not reauthenticated as determined at block 432, the method returns to block 430 for subsequent reauthentication process until an authorized user is present and the user biometric module and voice access capture module of the user authentication module can confirm that the user is an authorized user. Where, however, it is determined by the hardware processor of the information handling system that the user is authenticated at block 432, the method 400 proceeds to block 434 and includes the hardware processor executing machine readable code instructions of the mouse authentication and input control module unlocking the digital display device of the information handling system. Unlocking the digital display screen at block 434 thereby allows the authorized user to view and interact with the videoconference session in progress. At this point the method 400 may end when the videoconference session ends.

Returning to block 414, it is also appreciated that when the mouse MCU has determined that the wireless mouse is not in continuous motion and the wireless mouse is not within the threshold distance of the information handling system at block 426, the wireless mouse may have been left unattended away from the information handling system. Proceeding to block 436, other measures may be taken to prevent an unauthorized user from listening to and interacting with the other participants in the videoconference session. At block 436, the mouse MCU executing machine readable code instructions of the mouse authentication and input control agent revokes the user's authentication. Proceeding to block 438, the mouse MCU executes machine readable code instructions of the mouse authentication and input control agent to pause the audio data stream at the wireless mouse. The pausing of the audio at the wireless mouse may include the muting of the mouse microphone as it pertains to audio input during the videoconference session and muting the mouse speaker such that an unauthorized user may not interact with the videoconference session. At this point, the mouse MCU executes machine readable code instructions of the mouse authentication and input control agent to start a timeout timer such that the authorized user may be reauthenticated via voice access input monitored by the mouse voice access capture module. In an embodiment, this timeout time may be long enough for the user to recognize that the audio has been paused at the wireless mouse and begin to talk in order to provide sufficient voice data via the mouse microphone, which is otherwise muted to the videoconference, for the mouse MCU to execute machine readable code instructions of the mouse authentication and input control agent and its voice access capture module to compare. As described herein, the mouse MCU may execute machine readable code instructions of an authentication and input control agent (e.g., 172-2, FIG. 1) that receives voice access input from the user and, via a trained mouse environmental contextual ML algorithm module (e.g., FIG. 1, 174) and voice access capture module (e.g., FIG. 1, 192-2) to compare the currently-obtained voice access input to one or more audio samples within the audio sample database via execution of a trained neural network algorithm or other comparator for a sufficient correlation score of matching voice characteristic metrics in order to reauthorize the user. Again, the mouse authentication and input control agent may utilize a trained mouse environmental contextual ML algorithm module (e.g., FIG. 1, 174), for example, as well as the background acoustical environment of the wireless mouse and audio analysis of a voice picked up by the microphone of the wireless mouse to determine, at block 440, whether the voice of the user captured within the timeout timer period matches an authenticated user and occurred within the timer period.

Where no voice access input was obtained or was authenticated within the time limit of the timeout timer, the videoconference audio data stream routing to the wireless mouse for the remote mouse communication mode may be terminated at block 444 in order to prevent unauthorized users from listening to or engaging in the videoconference session. Thus, if the user has left behind the wireless mouse, the audio data stream may be rerouted back to the speaker and microphone at the information handling system in an embodiment so the user may continue the videoconference session upon returning to the information handling system with reauthentication there even if the wireless mouse was left behind. Where the voice access input is received and authentication from the user can be achieved within the time limit of the timeout timer at block 442, the videoconference session may be continued with the videoconference audio data stream through the wireless mouse even though it has been set on a surface and is outside of the threshold distance from the information handling system. The mouse MCU executes machine readable code instructions of the mouse authentication and input control agent to restart another timer in some embodiments within which the user may be required to provide voice access input by talking as recorded by a mouse microphone. As described, in some embodiments, the user may mute the mouse microphone while the wireless mouse is operating in the remote mouse communication mode, but the mouse microphone may still detect voice access input so that the user may continue authentication without having to hold the wireless mouse but may not necessarily provide audio input heard by others on the videoconference. In other embodiments, as the user speaks in the video conference, this talking may serve as voice access inputs to reauthenticate the user as well.

Then the method may proceed to block 446 where it may be determined if the information handling system is still initiated. Where the information handling system is no longer initiated, the method 400 may end here. Where the information handling system is still initiated, the method 400 continues to block 408 to determine if the wireless mouse, via the mouse IMU, has been lifted from a surface and is moving to trigger the remote mouse communication mode or continue with the remote mouse communication mode according to embodiments herein.

Figure 5:
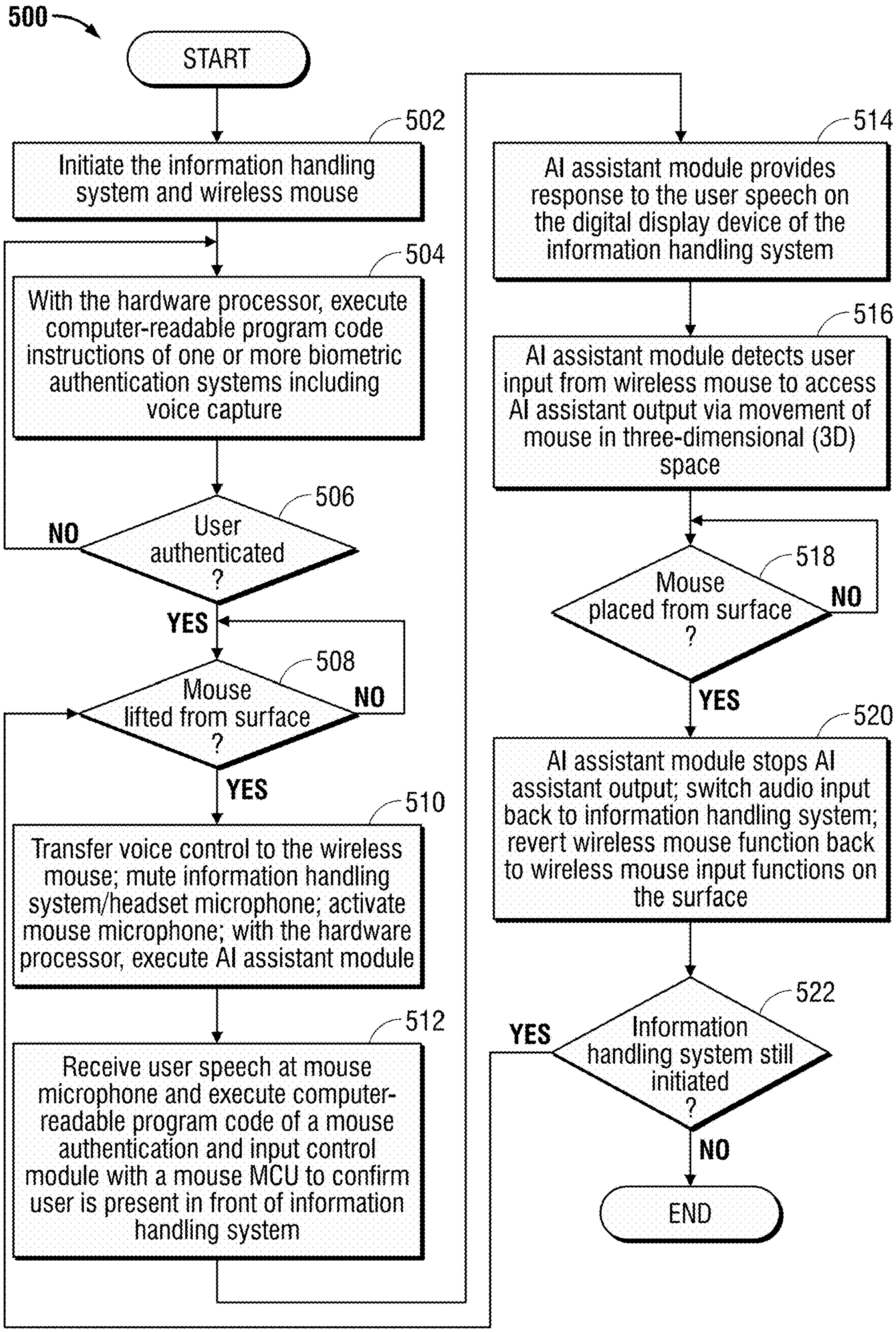
FIG. 5 is a flow diagram showing a hardware processor executing machine readable code instructions of a mouse authentication and input control module on an information handling system with a mouse having audio capabilities for a method of routing a secondary audio link with the wireless mouse during a videoconference call at an information handling system according to another embodiment of the present disclosure.

FIG. 5 is a flow diagram showing a method 500 of establishing a secondary audio data stream with a wireless mouse to utilize an AI assistant mode during a videoconference call at an information handling system according to another embodiment of the present disclosure. The method of FIG. 5 may be performed by a user using any of the information handling systems and wireless mice described in connection with FIGS. 1 through 3.

At block 502, the method 500 may include initiating the information handling system and wireless mouse. In an embodiment, each of these devices may be initiated by the user pressing a button or toggling a switch. This directs power from the PMU of the information handling system to its hardware processors and directing power from the PMU to the mouse MCU.

At block 504, the hardware processor of the information handling system may execute machine readable code instructions of the user biometric module and the voice access capture module of a user authentication module to collect biometric input from a camera or biometric sensor as well as voice access inputs from a microphone. Both of these may form part of the user authentication module that verifies that the user accessing the information handling system is an authorized user. Again, the voice access capture module may capture the voice of the user in order to verify, via the user's voice and voice characteristic metrics comparison to stored voice samples of the user's voice, that the user is authorized to access the information handling system. In order to accomplish this, in an example embodiment, the information handling system may include a contextual environmental ML module that receives the user's voice access input and compares that voice to audio samples of the user's voice previously captured in various contexts such as in a noisy environment, a quite environment, a specific location (identified via geolocation tagging for example), among other potential audio samples of the user's voice for a correlation score of the user voice characteristic metrics to meet a threshold level of correlation to indicate that the user is authenticated via the voice access input. This comparison will lead to the user gaining access to operations of the information handling system when the user is an authorized user. It is appreciated that, in some embodiments, authorization data related to this particular authorization of the user may be stored, at least temporarily, in a data storage device for later transfer to the wireless mouse during the method 500 described herein.

At block 506 if the user was authenticated to use the information handling system, the method proceeds to block 508. Where the user is not authenticated, the method 500 returns back to block 504 for subsequent authentication processes to be conducted until an authorized user's voice is detected and compared to those audio samples leading to authorization of a user.

Where the user has been authenticated, the method 500 continues to block 508 where the mouse MCU executes machine readable code instructions of the mouse authentication and input control agent to determine if output from the mouse IMU has indicated that the mouse had been lifted off of the surface it was placed on. The mouse IMU may include an accelerometer and gyroscope that can determine the orientation and movement of the wireless mouse as it is moved both over the surface and within 3D space as the user lifts the wireless mouse off of the surface. Where no such output is received from the mouse IMU indicating that the mouse has not been lifted, the method 500 returns to block 508 with the mouse MCU executing machine readable code instructions of the mouse authentication and input control agent to monitor for the event of the user lifting the wireless mouse off of the surface. However, where the mouse IMU provides output indicating a lifting of the wireless mouse from off of the surface, the method proceeds to block 510 with the mouse MCU executing machine readable code instructions of the mouse authentication and input control agent to initiate those processes described herein for an AI assistant mode with the wireless mouse.

At block 510 and after the mouse IMU has detected that a user has lifted the wireless mouse off of the surface, the method 500 includes transferring voice access authentication to the wireless mouse and establishing a secondary audio data stream wirelessly with the wireless mouse for receiving audio input to operate an AI assistant module operating, such as an LLM algorithm module, on the information handling system. Further, the hardware processor executes machine readable code instructions of the mouse authentication and input control module to mute the microphone on the information handling system (or a headset of the information handling system). The mouse MCU executes machine readable code instructions of the mouse authentication and input control agent to then activate the microphone of the wireless mouse for AI assistant input via this wireless secondary audio data stream. This allows a user to not be heard during the videoconference session on the video conference audio input stream while also providing audio input via the wireless mouse microphone to the AI assistant module for inputting a query to a chatbot LLM while the videoconference session is ongoing. At block 510, the method 500 also includes the mouse MCU sending a signal to the hardware processor of the information handling system to execute the machine readable code instructions of the AI assistant module and trigger the AI assistant to receive queries.

Proceeding to block 512, the mouse MCU may, via the microphone of the wireless mouse, receive user passive speech, including as queries to the AI assistant module, and execute machine readable code instructions of a mouse authentication and input control module with a mouse MCU to confirm user is present in front of information handling system via voice access authentication as well as receive an audio query input into the AI assistant module at the information handling system. In an embodiment, an AI assistant icon may appear on screen of a display device for the user to, with the wireless mouse movement in 3D space, move a cursor over the AI assistant icon to activate the AI assistant or select items within the AI assistant icon or AI response windows for input to the AI assistant module along with chatbot inputs via the wireless mouse microphone. As described herein, previous authentication data on the information handling system may be transferred to the wireless mouse for these authentication purposes and may include one or more audio samples that are to be stored within the audio sample database on the wireless mouse.

At block 514, the method 500 includes the AI assistant providing responses to the user's speech input. As described in connection with FIG. 3 herein, the user may interact with the AI assistant via voice input as well as via selection movements of the wireless mouse within 3D space. In an embodiment, the mouse IMU may be used to provide output to the information handling system indicative of which of the AI assistant results displayed on a AI assistant results GUI on the digital display device is to be selected. As shown in FIG. 3, for example, the AI assistant GUI may, based on the user vocal input at the mouse microphone, present one or more AI assistant response GUI to the user on the digital display device. For example, a first AI assistant response GUI may provide relevant information related to the subject matter being presented to the user during the videoconference session and a second AI assistant response GUI may include relevant information related to any additional questions the user may have or may include ancillary information with citations the user may access through the wireless mouse. The AI assistant response GUIs may be overlayed over the videoconference session GUI that is being presented to the user on the digital display device.

In an embodiment, the mouse microphone may continuously receive audio input from the user in order to engage, verbally, with the executed AI assistant in order to gain more information. In an example embodiment, the user may request more information related to what is being discussed or shown on the videoconference session. Instead of the user interfering with the flow of the discussion during the videoconference session, the user may lift the wireless mouse and engage with the AI assistant in order to ask these questions as queries to the AI assistant module. In an embodiment, a peripheral AI assistant module may be executed by the mouse MCU as machine readable code instructions of an LLM algorithm or other AI assistant module so that the wireless mouse may communicate the voice access input as a query to the AI assistant module of the information handling system. Further, at block 516, the AI assistant module may detect user voice access input from a microphone and secondary wireless audio data stream from the wireless mouse as a query to access AI assistant output generating AI assistant response GUI windows or an AI assistant icon that the user may interact with via inputs received at the AI assistant module via movement of mouse in 3D space as detected via the mouse IMU. The movements of the mouse in 3D space detected by the mouse IMU may cause the mouse MCU to execute machine readable code instructions of the mouse authentication and input control agent to provide cursor movement commands to the information handling system to allow a user to navigate the AI assistant response GUIs or the AI assistant icon to select items or function icons to further utilize the AI assistant module according to embodiments herein.

At block 518, the mouse MCU may determine, from the mouse IMU, an optical sensor, or other sensor if and when the wireless mouse has been placed back onto a surface such as onto a mouse pad near the information handling system. Where the mouse has not been placed back onto the surface, the user may be allowed to continuously interact with the AI assistant in order to get more information while the audio input to the videoconference session is muted. In some embodiments herein, the mouse MCU executes machine readable code instructions of a mouse beacon module or modules to determine whether a threshold distance has been exceeded from the information handling system. In one optional embodiment, if the threshold distance is exceeded, the mouse MCU executes machine readable code instructions of the mouse authentication and input control agent to transition beyond a threshold distance to a remote mouse communication mode as described in FIG. 4 and other embodiments herein.

Where, however, the user replaces the wireless mouse back onto the surface at block 518, the method 500 includes the stopping the AI assistant module from providing AI assistant output while ending the AI assistant mode and ending the secondary audio data stream to the wireless mouse and unmuting the video conference audio input via the microphone back on information handling system. Additionally, the wireless mouse functions are reverted back to two-dimensional (2D) wireless mouse cursor input functionalities as before the wireless mouse was picked up. In some embodiments however, the AI assistant results GUIs may remain available or active for the user to review while reengaging with the video conference via the speaker and microphone on the information handling system.

Proceeding to block 522, a determination is made to as to whether the information handling system is still initiated at block 522. Where the information handling system is no longer initiated, the method 500 may end here. Where the information handling system is still initiated, the method 500 continues to block 508 where the mouse MCU executes machine readable code instructions of the mouse authentication and input control agent to monitor for and to determine if the wireless mouse is again lifted off of the surface.

The blocks of the flow diagram of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless mouse for interfacing with an information handling system comprising:

a mouse microcontroller unit (MCU), a mouse memory device, a mouse speaker, and a mouse microphone with a wireless mouse power management unit (PMU) to provide power to the mouse MCU, the mouse memory device, the mouse microphone, and the mouse speaker;

the mouse MCU executing machine readable code instructions of a mouse authentication and input control agent to receive output from one or more sensors to indicating that the wireless mouse has been lifted off of a surface by a user;

the mouse MCU executing machine readable code instructions of the mouse authentication and input control agent to send a signal to the information handling system to reroute videoconference audio input and audio output during a videoconference call at the information handling system in a wireless audio data stream to the mouse microphone and the mouse speaker in the wireless mouse when the one or more sensors indicate the wireless mouse has been lifted off of the surface;

the mouse MCU executing machine readable code instructions of the mouse authentication and input control agent to monitor for movement of the wireless mouse as the user holds the wireless mouse to maintain continued authorization for use of the wireless mouse for the videoconference audio input and audio output; and the mouse MCU executing machine readable code instructions of the mouse authentication and input control agent to revert the videoconference audio input and output to the information handling system when the one or more sensors detect that the user has placed the wireless mouse back on the surface within a threshold distance of the information handling system.

2. The wireless mouse of claim 1, wherein the one or more sensors comprise an internal measurement unit comprise an accelerometer and a gyroscope to detect whether the wireless mouse has been lifted off of the surface and to monitor movement, wherein detection of the wireless mouse being lifted off of the surface causes the information handling system to, wirelessly, route the videoconference audio input and output to the wireless mouse.

3. The wireless mouse of claim 1 further comprising:

the mouse MCU executing machine readable code instructions of the mouse authentication and input control agent to passively detect the user's passive voice speech, compare the detected passive voice speech to stored audio samples of a user from an audio sample database on the wireless mouse, and authenticate the user via voice authentication to maintain audio input and output via the wireless mouse when the wireless mouse is detected as being placed on the surface when a mouse beacon module detects that the wireless mouse is beyond a threshold distance from the information handling system.

4. The wireless mouse of claim 3, wherein the mouse MCU starts a timeout timer when the wireless mouse is detected as being placed on the surface beyond the threshold distance from the information handling system such that the when a timeout timer period ends without further detected passive voice speech to authenticate the user's voice, the videoconference audio input and output for videoconference call is reverted back to the information handling system and the wireless audio data stream with the wireless mouse is terminated.

5. The wireless mouse of claim 1 further comprising:

the mouse MCU executing machine readable code instructions to determine a distance of the wireless mouse relative to the information handling system from a mouse beacon module; and the mouse MCU executing machine readable code instructions of the mouse authentication and input control agent to revoke user authentication and pause the videoconference audio input and audio output at the wireless mouse when the wireless mouse is detected as being placed on a surface beyond a threshold distance from the information handling system for a threshold period of time.

6. The wireless mouse of claim 5 further comprising:

the mouse MCU executing machine readable code instructions of the mouse authentication and input control agent to initiate reauthentication via execution of a passive voice capture module to monitor for passive voice input from the user when the wireless mouse is detected as being placed on a surface beyond the threshold distance from the information handling system for more than the threshold period of time.

7. The wireless mouse of claim 1, further comprising:

the mouse MCU to execute the mouse authentication and input control agent to detect output from the one or more sensors including an inertial measurement unit (IMU) to detect a transition gesture at the wireless mouse in three-dimensional (3D) space to transition the operation of a mouse from operation as the video conference audio input and output device in a remote mouse communication mode to operation as an AI assistant input device with a secondary wireless audio data stream as an AI assistant input device to operate with an AI assistant module executing on the information handling system.

8. The wireless mouse of claim 1, further comprising:

the mouse MCU executing machine readable code instructions to determine a distance of the wireless mouse relative to the information handling system from a mouse beacon module, wherein the mouse beacon module determines proximity of the wireless mouse to the information handling system using at least one of Ultra-Wideband ranging measurement unit or a Bluetooth low-energy received signal strength indicator (RSSI) measurement unit.

9. The wireless mouse of claim 1, further comprising:

the mouse MCU executing machine readable code instructions to determine a distance of the wireless mouse relative to the information handling system from a mouse beacon module, wherein when the mouse beacon module determines proximity of the wireless mouse to the information handling system returns within a threshold distance, the mouse authentication and input control agent sends a signal to the information handling system to unlock a display screen showing a videoconference graphical user interface.

10. A wireless mouse for interfacing with an information handling system comprising:

a mouse microcontroller unit (MCU), a mouse memory device, a mouse speaker, and a mouse microphone with a wireless mouse power management unit (PMU) to provide power to the mouse MCU, the mouse memory device, the mouse microphone, and the mouse speaker;

the mouse MCU executing machine readable code instructions of a mouse authentication and input control agent to receive output from one or more sensors to indicating that the wireless mouse has been lifted off of a surface by a user;

the mouse MCU executing machine readable code instructions of the mouse authentication and input control agent to send a signal to the information handling system to mute audio input during a videoconference call at the information handling system and establish a secondary wireless audio data stream with the wireless mouse to receive artificial intelligence (AI) assistant audio input via the mouse microphone in the wireless mouse when the one or more sensors indicate the wireless mouse has been lifted off of the surface while the videoconference call continues at the information handling system;

the mouse MCU executing machine readable code instructions of the mouse authentication and input control agent to monitor for movement of the wireless mouse as the user holds the wireless mouse to maintain continued authorization for use of the wireless mouse for the videoconference audio input and audio output and for receive AI assistant audio input; and the mouse MCU executing machine readable code instructions of the mouse authentication and input control agent to receive the AI assistant audio input from the user to signal a hardware processor of the information handling system to execute machine readable code instructions of an AI assistant module to receive queries via the AI assistant audio input from the secondary wireless audio data stream and to generate responsive graphical user interface (GUI) windows on a display device along with a display GUI of the videoconference call.

11. The wireless mouse of claim 10, wherein the one or more sensors comprise an internal measurement unit comprising an accelerometer and a gyroscope to detect whether the wireless mouse has been lifted off of the surface.

12. The wireless mouse of claim 10 further comprising:

the mouse MCU executing machine readable code instructions of the mouse authentication and input control agent receive sensor input detecting that the wireless mouse is placed on the surface again and terminate the secondary audio data stream from receiving the AI assistant audio input at the wireless mouse microphone.

13. The wireless mouse of claim 10 further comprising:

the mouse MCU executing machine readable code instructions of the mouse authentication and input control agent to receive output from one or more sensors to indicating that the wireless mouse has been lifted off of the surface by the user and to detect a transition gesture at the wireless mouse in three-dimensional (3D) space to transition the operation of a mouse from operation to receive AI assistant audio input for the AI assistant module in an AI assistant mode to operate to exchange videoconference audio input and output in for the videoconference in a remote mouse communication mode; and the mouse MCU executing machine readable code instructions of the mouse authentication and input control agent switch from the secondary wireless audio data stream for receiving the AI assistant audio input to a videoconference audio data stream during the videoconference call at the information handling system to receive videoconference audio input via the mouse microphone and to provide videoconference audio output via the mouse speaker in the wireless mouse.

14. The wireless mouse of claim 13 further comprising:

the mouse MCU executing machine readable code instructions to determine a distance of the wireless mouse relative to the information handling system from a mouse beacon module; and the mouse MCU executing machine readable code instructions of the mouse authentication and input control agent to switch from the secondary wireless audio data stream for receiving the AI assistant audio input to a videoconference audio data stream during the videoconference call at the information handling system to receive videoconference audio input via the mouse microphone and to provide videoconference audio output via the mouse speaker in the wireless mouse when the distance of the wireless mouse relative to the information handling system is greater than a threshold distance.

15. The wireless mouse of claim 10 further comprising:

the mouse MCU executing machine readable code instructions of the mouse authentication and input control agent to passively detect the user's passive voice input speech upon detecting that the wireless mouse has been lifted off of the surface and compare the detected passive voice input speech to stored audio samples to authenticate the user and maintain receiving AI assistant audio input at mouse microphone on the wireless mouse.

16. A method of routing a videoconference audio data stream to a wireless mouse during a videoconference call at an information handling system comprising:

with a mouse microcontroller unit (MCU), executing machine readable code instructions of a mouse authentication and input control agent to:

receive output from one or more sensors on the wireless mouse indicating that the wireless mouse has been lifted off of a surface by a user;

transmit a signal to the information handling system to reroute videoconference audio input and audio output during a videoconference call at the information handling system to wirelessly transceive the videoconference audio data stream to a mouse microphone and a mouse speaker in the wireless mouse via a mouse wireless adapter in a remote mouse communication mode;

monitoring for movement of the wireless mouse as the user holds the wireless mouse to maintain videoconference audio input and output via mouse microphone and the mouse speaker at the wireless mouse and maintain user voice authentication during the remote mouse communication mode based on whether movement is detected indicating that the user is holding the wireless mouse; monitoring whether the user has placed the wireless mouse back on the surface or another surface; and receive output from the one or more sensors on the wireless mouse indicating that the wireless mouse has been placed on the surface by the user and terminate wireless videoconference data stream being wirelessly transceived with the mouse wireless adapter for receiving videoconference audio input and audio output at the wireless mouse and receive the videoconference audio input and audio output of the videoconference call at the information handling system to end the remote mouse communication mode.

17. The method of claim 16 further comprising:

with the mouse MCU, executing machine readable code instructions of the mouse authentication and input control agent to determine a distance of the wireless mouse from the information handling system in an exchange with a mouse beacon module operating at the information handling system to monitor that distance of the wireless mouse from the information handling system is within a threshold distance when the one or more sensors on the wireless mouse indicate that the wireless mouse has been placed on the surface before ending the remote mouse communication mode.

18. The method of claim 16, wherein the one or more sensors comprise an internal measurement unit comprise an accelerometer and a gyroscope to detect whether the wireless mouse has been lifted off of the surface.

19. The method of claim 16 further comprising with the mouse MCU, executing machine readable code instructions to determine a distance of the wireless mouse relative to the information handling system from a mouse beacon module; and with the mouse MCU, executing machine readable code instructions of a mouse authentication and input control agent to passively detect the user's passive voice input speech upon detection that the wireless mouse has been lifted off of the surface, compare the detected passive voice input speech to previously stored audio samples of the user on an audio sample database on the wireless mouse, and authenticate the user by the user's passive voice input speech to maintain videoconference audio input and audio output via the wireless mouse when the wireless mouse is detected as being placed on the surface beyond a threshold distance from the information handling system.

20. The method of claim 16 further comprising with the mouse MCU, executing machine readable code instructions to determine a distance of the wireless mouse relative to the information handling system from a mouse beacon module; and with the mouse MCU, executing machine readable code instructions of a mouse authentication and input control agent to receive output from the one or more sensors on the wireless mouse indicating that the wireless mouse has been placed on the surface by the user and terminate wireless videoconference data stream being wirelessly transceived with the mouse wireless adapter for receiving videoconference audio input and audio output at the wireless mouse when the wireless mouse is placed on the surface within a threshold distance from the information handling system to end the remote mouse communication mode.

* * * * *